United States Patent [19]

Shizhang

[11] Patent Number: 4,736,147
[45] Date of Patent: Apr. 5, 1988

[54] METHOD OF STARTING MOTORS BY HARMONICS AND ELECTRICAL MOTORS STARTED BY THIS METHOD

[75] Inventor: Xu Shizhang, Wuhan, China

[73] Assignee: Huazhong Institute of Technology, Hubei, China

[21] Appl. No.: 846,162

[22] Filed: Mar. 31, 1986

[30] Foreign Application Priority Data

Apr. 1, 1985 [CN] China .................................. 85102382

[51] Int. Cl.$^4$ .............................................. H02P 1/26
[52] U.S. Cl. .................................... 318/778; 318/737; 318/771; 318/785; 318/821
[58] Field of Search ................ 310/179; 318/704, 716, 318/718, 734, 737, 766, 767, 771, 778, 785, 821

[56] References Cited

U.S. PATENT DOCUMENTS

| | | | |
|---|---|---|---|
| 1,875,263 | 8/1932 | Richter | 318/771 |
| 2,018,253 | 10/1935 | Dapprich | 318/821 X |
| 3,187,245 | 6/1965 | Sisk et al. | 318/778 |
| 4,313,076 | 1/1982 | Rathje | 318/785 X |

FOREIGN PATENT DOCUMENTS

| | | | |
|---|---|---|---|
| 54-111613 | 9/1979 | Japan | 318/716 |
| 54-129306 | 10/1979 | Japan | 318/771 |
| 0743741 | 1/1956 | United Kingdom | 318/821 |
| 1020643 | 2/1966 | United Kingdom | 318/821 |
| 756550 | 8/1980 | U.S.S.R. | |

OTHER PUBLICATIONS

Chinese Publication "Technical Information of Middle and Small Electric Machines", 1979, No. 1, pp. 16-20.
Chinese Publication "Technical Information of Middle and Small Electric Machines", 1980, No. 4, pp. 27-30.

Primary Examiner—Bentsu Ro
Attorney, Agent, or Firm—Armstrong, Nikaido, Marmelstein & Kubovcik

[57] ABSTRACT

The present invention provides a method for starting motors by harmonics for synchronous motors, wound-rotor and cage-rotor asynchronous motors started thereby. During the starting period, according to the present invention, the connection of the stator winding is changed so as to create some very strong harmonic fields. The harmonic fields are associated with the rotor windings and are used to improve the starting performance of the motor. The three motors all have large starting torque, small starting current and can be started by direct-on-line. The wound-rotor asynchronous motor has no brushes or, slip rings on the rotor and there is no electric contact thereby increasing the reliablity of starting and running. The running efficiency is superior to the cage-rotor asynchronous motor.

6 Claims, 19 Drawing Sheets

METHOD OF STARTING MOTORS BY HARMONICS AND ELECTRICAL MOTORS STARTED BY THIS METHOD

FIELD OF THE INVENTION

The present invention relates to a method of starting AC motors and the connection and the construction of the stator and rotor windings of AC motors driven thereby.

BACKGROUND OF THE INVENTION

In order to increase the starting torque of a motor and to decrease the starting current, a wound-rotor or a cage with a special slot, such as a deep slot or double cage, etc., is used for asynchronous motors. A damping cage is used for asynchronous starting at low voltage for a synchronous motor. At the present, there are many publications about the solution or improvement of the starting torque and starting current, for example, a Chinese publication "Technical information on medium and small electric machines" 1979, No. 1, P. 16–20 and 1980, No. 4, P. 27–30; USSR Pat. No. 756550, etc. The starting method of a wound-rotor asynchronous motor without slip rings and extra starting resistors, which is proposed in "Technical information on medium and small electric machines" 1979, No. 1 and 1980, No. 4, is to change the connection of rotor windings when the motor starts, by opening and closing three contact points in the rotor winding. Although the motor, which is provided in the literature, has eliminated the slip rings and the brushes, it is necessary to have a means for opening and closing the contact points when the rotor rotates which complicates the construction of the rotor and decreases the reliability of the motor. The motor, by means of changing the connection of the rotor winding, increases the resistance and the reactance of the rotor referred to as the stator side, and decreases the starting current and increases the starting torque. However, the starting torque does not increase much due to the increase of the reactance and the decrease of the maximum torque as well, so that it cannot be used where a large starting torque is needed.

USSR Pat. No. 756550 proposes a three-function winding for starting, excitation and damping of a four-pole synchronous motor. It uses the fundamental wave to start the motor with the same pole numbers for starting and running. The three-phase windings on the rotor are: from phase 1 to phase 2 will be displaced 60°, while from phase 2 to phase 3 will be displaced 60°, and from phase 3 to phase 1 displaced 240° electric degrees. It is not a symmetric three-phase system. Such a motor will provide a large starting torque only when the two terminals for DC excitation are short-circuited. It is not easy to reach synchronous speed for heavy loads. The heavier the load is, the more difficult it is to pull into step (or synchronization) after the DC is applied. In addition, it must start with a lower voltage, in order to decrease the starting current, so as to decrease the starting torque. The three-function winding of the motor cannot be connected with starting resistors in series during the starting period, otherwise it will cause the three-phase current to be more asymmetric. Since the starting current and the direct-current excitation of the three-function winding flow in the same path and interfere with each other, they will not exist at the same time. In brief, the motors and other starting methods which are widely used now have many problems in the manufacture and the running of the motor, such as complicated construction, low reliability of running, high cost, having a large impulse of current occur during the starting process, interference to power network, shortening of the service life of the motor, insufficient starting torque, difficulty in pulling into step, etc. The efficiency of a cage asynchronous motor is not very high because of the large copper loss of the rotor.

The object of the present invention is to provide a starting method to overcome these disadvantages and to offer a general way to design such windings. According to this design, it is easy to produce a series of motors with simple construction and good starting performance.

The starting method of an AC motor will directly affect the performance of the motor, the construction of the motor, and the extra apparatus which is needed during the starting process. Finally, it will affect the running performance of the motor and the reliability of the whole procedure from starting to running. The current starting methods utilized or proposed are not able to offer a good solution to all the problems listed above.

SUMMARY OF THE INVENTION

The object of the present invention is to offer a starting method known as "harmonic starting" which will comparatively meet all requirements mentioned above, while at the same time, provide three kinds of motors which can be driven by the method.

The following three kinds of motors can be driven using the harmonic starting method of the present invention:

1. A wound-rotor asynchronous motor without slip rings, brushes, or electric contacts on its rotor can be driven with the present method. Since the rotor of the motor is rather simple and extra starting apparatus are omitted, the motor not only decreases the cost investment sharply, but also increases the reliability of starting and running.

2. A non-salient-pole synchronous motor with a two-function dampening and excitation winding having a large starting torque can be driven with the present invention. This motor is much better than a conventional synchronous motor since it has a simple rotor construction, large starting torque and is easy to pull into step without having an extra starting apparatus.

3. A cage-rotor asynchronous motor with large starting torque and high efficiency can be driven with the present invention. The motor may be used to replace the conventional cage-rotor asynchronous motors which are widely used in industries since the rotor-slot of the harmonic starting motor may be a circle which is the simplest to manufacture. The motor will have large starting torque and high efficiency.

The harmonic starting method of the invention will be described in detail as follows:

1. Harmonic starting method—The main conception of the harmonic starting method which the present invention proposes is as follows:

During the starting process, the stator winding, which is connected normally in accordance with the design based on the fundamental or working wave, is partially connected to the power network (switched on line), or it is switched on line after the connection of the stator winding is changed so that one or more harmonic magnetic fields with a pole-number, rather than that of the working wave, will occur in the machine. This is called "Starting Harmonics". In this case, either the starting harmonics and the fundamental wave exist in common, which will start the motor jointly, or only the starting harmonics exist without the working wave, where the starting harmonics will drive up the motor. Only one winding is set in the rotor of the motor. Two or more resistors called "starting resistor" are fixed in the winding. The resistors are so designed that the currents induced by the starting harmonics in the rotor have to flow through the starting resistors to form a path. The current in the rotor induced by the fundamental wave does not go or flow through the starting resistor to form a short-circuit closed loop. Thus, the starting harmonic will create a very large starting torque causing the motor to start rapidly and speed up due to the effect of the starting resistors during the starting process. At the same time, the starting current will be decreased. When the speed of the motor approaches its rated value, the other part of the stator winding, which has not yet been connected, is switched on line, or the stator winding is reconnected in accordance with the normal condition and then switched on line so that the starting harmonics are eliminated completely and the motor will run by the working wave. In this case, the current of the rotor will not flow through the starting resistors. Therefore, the rotor losses are rather small and the motor runs at a high efficiency.

2. A wound-rotor asynchronous motor started by harmonics—For harmonic starting, the starting resistors may be fixed on a place on the rotor where the cooling condition is good. Since the starting resistors are connected with the rotor winding firmly, therefore, slip rings, brushes, brush-lifter and short-circuit mechanics are eliminated. Any contact point on the rotor is also eliminated, thus, a wound-rotor asynchronous motor without slip rings, brushes and electric contacts is produced.

3. A cage-rotor asynchronous motor started by harmonics—The rotor winding consists of conducting bars and end-rings to form a cage, thus resulting in a cage-rotor asynchronous motor with harmonics starting. The starting resistors are replaced by the end-rings which are made from high resistance material. Many connecting pieces which are made form low resistance material, are installed on its outer or inner surface so as to short-circuit a number of pairs of the conducting bars. The currents in the rotor, induced by the starting harmonics of the stator, will flow through the high resistance end-rings to form a path. The current of the rotor, induced by a fundamental or working magnetic field, flows through the low resistance connecting pieces to form a short-circuit closed loop. In this case, the form of the rotor-slot may be a circle which is easy to punch and easy to manufacture. Large circular copper bars are used as the conducting bars so that the resistance of the bars is low. During the harmonic starting process, a very large starting torque is created by means of the high resistance end-ring. When the motor comes to a running status, the copper losses of the rotor are low so as to ensure the high efficiency of the motor since the rotor current does not pass through the high resistance end-ring.

4. A non-salient-pole synchronous motor started by harmonics—There is only one winding on the rotor of the motor. The winding connects the starting resistors for increasing the starting torque and decreasing the starting current. Two points on the winding are connected to two slip rings respectively, and the DC voltage is applied to the two slip rings. When a DC excitation current flows into the winding, it will create a magnetic field with the same poles of the working wave. The current in the rotor induced by the starting harmonics of the stator will flow through the starting resistors to form a path. The DC excitation current does not flow through the starting resistors to form a path. Thus, during the starting process, by means of the effect of the starting resistors in response to the starting harmonics, a large starting torque will be created. At the running status, extra losses do not occur since the excitation current does not flow through the starting resistors. In many cases, this kind of rotor winding has a dampening effect on the oscillation. A synchronous motor with a three-function winding for harmonic starting, excitation and damping is constructed in such a way.

By means of the harmonic starting method in accordance with this invention, the resistance of the starting resistors of the rotor may be chosen as any independent value, which does not depend on the reactance of the rotor. Therefore, the maximum torque of the motor can be held to its desired value. The starting resistor may be chosen, if necessary, in a way even having the starting torque equal to its maximum torque. Thus, it can be used where a large starting torque and a small starting current are desired. There is also no impulse of current. For the wound-rotor asynchronous motor based on the present invention, there is no electric contact point, no slip rings and brushes on the rotor. It is not necessary to have any extra starting apparatus, such as a means for dropping the voltage, frequency converters and starting rheostats and the like. The method will simplify the construction of the rotor and will eliminate the possibility of any fault in the rotor circuit, thus increasing the reliability of starting and running. The method will make the motor easy for maintenance.

In comparison with USSR Pat. No. 756,550, the starting method of this invention utilizes a harmonic for starting, the number of pole pairs being one less than that of the fundamental wave. The speed is beyond the synchronous speed of the working wave. When a DC excitation current is applied, it is easy to pull into step. The rotor winding according to the present invention has quite strict symmetric three-phase system or a two-phase system ensuring a minimum of rotor harmonics and a good starting performance during the starting period. In accordance with the invention, the starting current and excitation current in the rotor of the synchronous motor will flow through two different circuits. They are not affected by each other and may exist in common. Therefore, the DC excitation current may be applied to the rotor during the starting process. It is easy to control and regulate. Since the starting resistors are fixed on the rotor and a part of the stator winding is switched on line and the pole-number of the harmonics is less than that of the fundamental wave, the starting current is small and the voltage dropping device is omitted. The motor can be started by direct-on-line current.

The connection and the construction of the stator and rotor winding of the motor, according to the harmonic starting method of the present invention, will be explained further by reference of the accompanying drawings and embodiments.

DETAILED DESCRIPTION OF THE INVENTION (I) Several modes of harmonic starting

A number of modes may be used for the harmonic starting. In view of the number of switches needed and the simplicity of the starting operation, the following starting modes are proposed.

Figure 2:
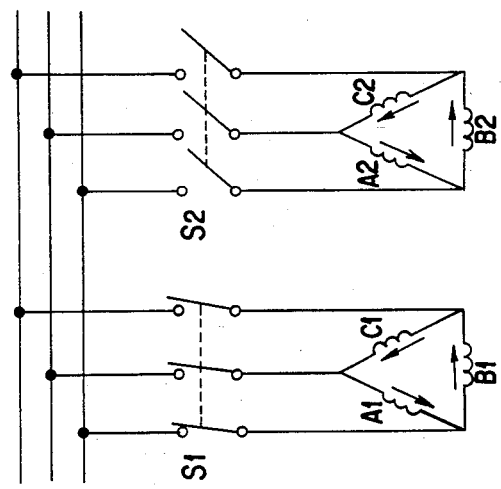
FIG. 2 shows a double delta in parallel connection stator winding for harmonic starting.
Figure 1:
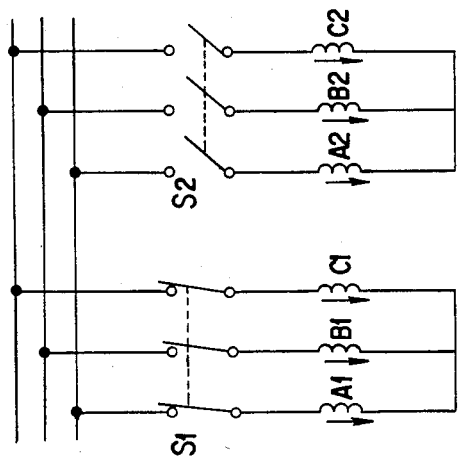
FIG. 1 shows a double-star parallel connection of the stator winding for harmonic starting.

1. A parallel starting mode—The stator winding which is connected normally in a 60° phase belt is divided into two parallel parts. During the starting process, the first part (A1, B1, C1) is first switched on line and the second part (A2, B2, C2) is switched on line while the speed approaches its desired rated value. Then these two parts are running in parallel, which is the same as the normal connection with a 60° phase belt. This kind of parallel connection is called "normal parallel connection". FIGS. 1 and 2 show a connection of the stator winding based on the starting mode. FIG. 1 is a three-phase star connection. FIG. 2 is a delta connection. The switch S1 is turned on as the motor starts. Subsequently the switch S2 is turned on when the motor approaches its rated speed. In this way, it is only necessary to add a three-pole single-throw switch. Since only a part of the stator winding is connected during the starting of the motor, the starting current is small due to the action of the starting resistors in the rotor. And since the first part (A1, B1, C1) of the stator winding is always connected on line during the whole starting process, the motor speeds up smoothly so that there is not a very large impulse of current. That is to say, this is a desirable starting mode.

Figure 3:
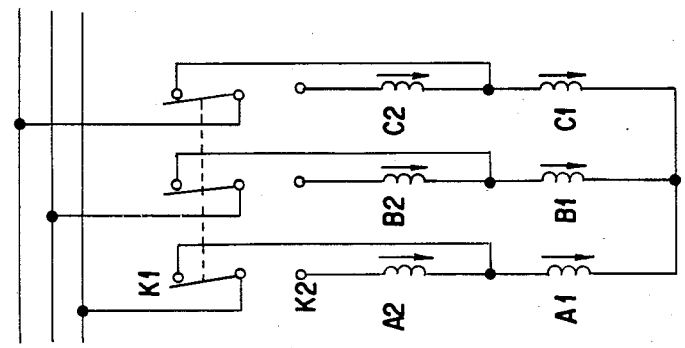
FIG. 3 is a double star in series connection stator winding for harmonic starting.

2. A series starting mode—The stator winding which is normally connected in a 60° phase belt is divided into two series parts. The first part (A1, B1, C1) is switch on line during the starting process. When the speed reaches its rated value, the first part (A1, B1, C1) is disconnected from the line and reconnected with the second part (A2, B2, C2) in series, then the first part is switched on line again. Thus, the two parts will run in series, which is the same as the winding connected normally a 60° phase belt (or winding distribution angles). This is called a "normal series connection". FIG. 3 shows the connection of the stator based on the above-mentioned starting mode. It is star connection of three phases and there is only one three-pole double-throw switch. The switch is closed to K1 during the starting. The switch is closed to K2 after the starting.

Figure 4:
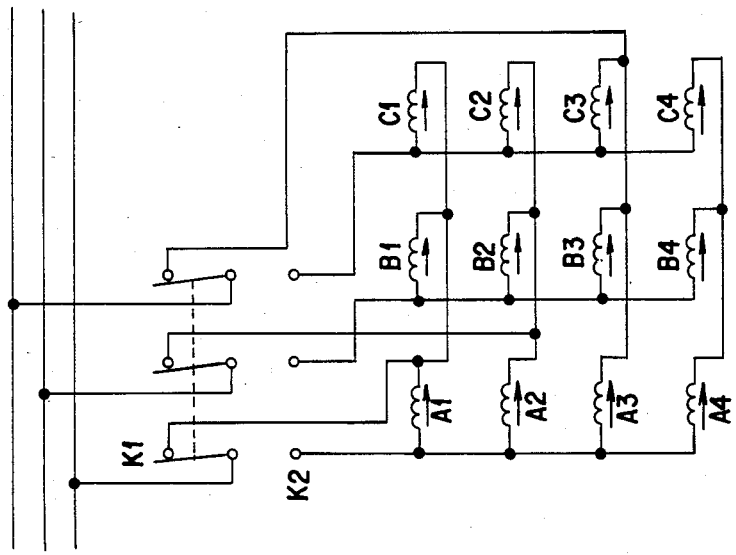
FIG. 4 is 4Y−3Y connection stator winding for harmonic starting.

3. 4Y−3Y starting mode—The stator winding connected normally in a 60° phase belt (the width distribution of all coils of each phase, in this case a 60° phase belt) is connected in 4Y form. That is, a four star connection in parallel as shown in FIG. 4, A1, B1, C1; A2, B2, C2; A3, B3, C3; and A4, B4, C4. During the starting, A1, A2, A3; B1, B2, B3; C1, C2, C3 are connected in a three star parallel connection and are switched on line. That is the switch is closed to K1 as shown in FIG. 4. When the speed approaches its rated value, the switch is closed to K2, then the motor is running in the normal 4Y connection. Only a three-pole double-throw switch is needed for this starting mode.

Figure 5:
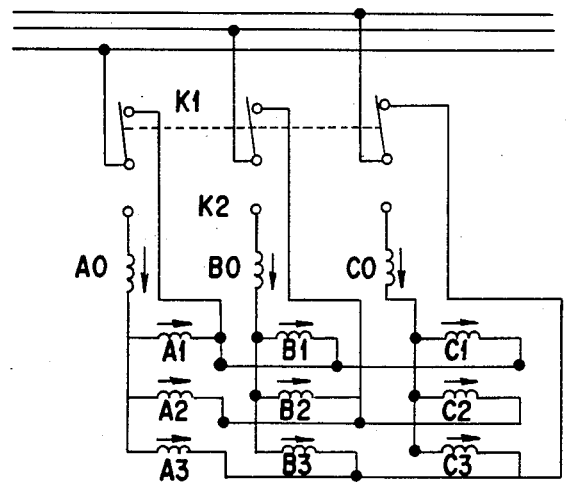
FIG. 5 is a (3Y+Y)−3Y connection stator winding for harmonic starting.

4. (3Y+Y)—3Y starting mode—The stator winding in normal running status is connected in a way having the 3Y and single Y connected in series as shown in FIG. 5. The parallel 3Y windings are A1, B1, C1; A2, B2, C2 and A3, B3, C3. The single Y winding connected in series with the 3Y is A0, B0, C0. During the starting, the three parallel star connection of A1, A2, A3; B1, B2, B3; and C1, C2, C3 are switched on line, that is, the switch to K1 is closed as shown in FIG. 5. When the speed approaches its rated value, the switch is thrown to K2. The motor is thus running in the form of 3Y+Y. A three-pole double-throw switch is need for such a starting mode.

Figure 6:
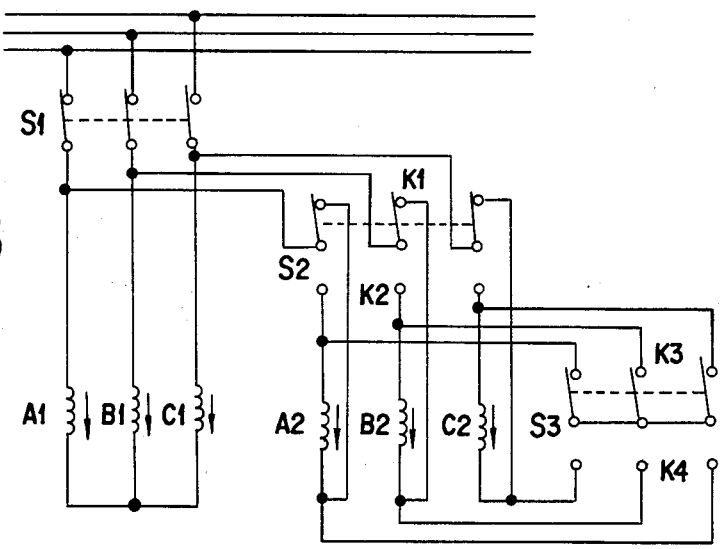
FIG. 6 is an inverse parallel—normal parallel double star connection stator winding for harmonic starting.
Figure 7:
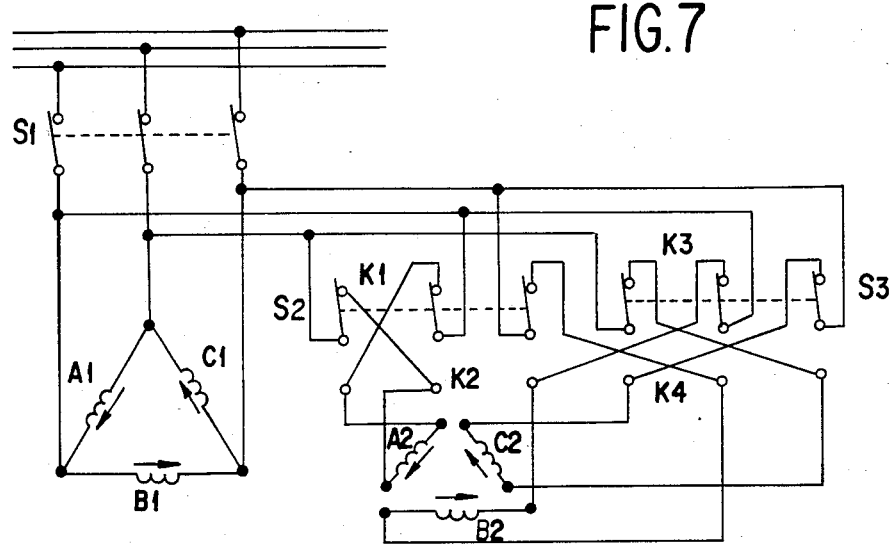
FIG. 7 is an inverse parallel—normal parallel double delta connection stator winding for harmonic starting.

5. Inverse parallel—normal parallel starting mode—In the foregoing first starting mode, that is, normal parallel mode, if the three phases of the second part (A2, B2, C2) are connected inversely and then connected with the first part (A1, B1, C1) in parallel so as to form an inverse parallel connection, the working magnetic fields induced by the two parts respectively cancel each other out, while the starting harmonics are overlapped and strengthened. As a result of the combination of the two parts, only a very strong starting harmonics exists without the working wave. In this case, by means of the starting resistors and the starting harmonics, a strong starting torque can be created. Thus, the inverse parallel to normal parallel starting mode may be used as shown in FIG. 6 where a very large starting torque is desired for the load. The starting procedure is as follows: first, the switch S3 is closed to K3 and the switch S2 is closed to K1. Thus, the second part (A2, B2, C2) and the first part (A1, B1, C1) form an "inverse parallel". Then the switch S1 is closed on line and the motor starts and speeds up rapidly. When the speed approaches its rated value, the switch S2 and S3 are opened and the second part (A2, B2, C2) is cut out from the power network, while the first part (A1, B1, C1) is still connected on line. The working wave and the starting harmonic produced by the first part have sped up the motor successively. When the speed is approaching its rated value, the switch S3 is closed to K4 and the switch S2 is closed to K2 in turn so that the second part (A2, B2, C2) and the first part (A1, B1, C1) form a normal parallel connection. The starting harmonics are totally eliminated and the motor now runs normally under the working wave. It is the advantage of the starting mode that the starting torque is very large and there is no impulse current during the starting process. However, since two three-pole double-throw switches are needed, the starting operation would be a little bit complicated. FIG. 6 shows a star connection. FIG. 7 shows a circuit arrangement for a delta connection. The operation procedure is exactly the same as that given above.

Figure 8:
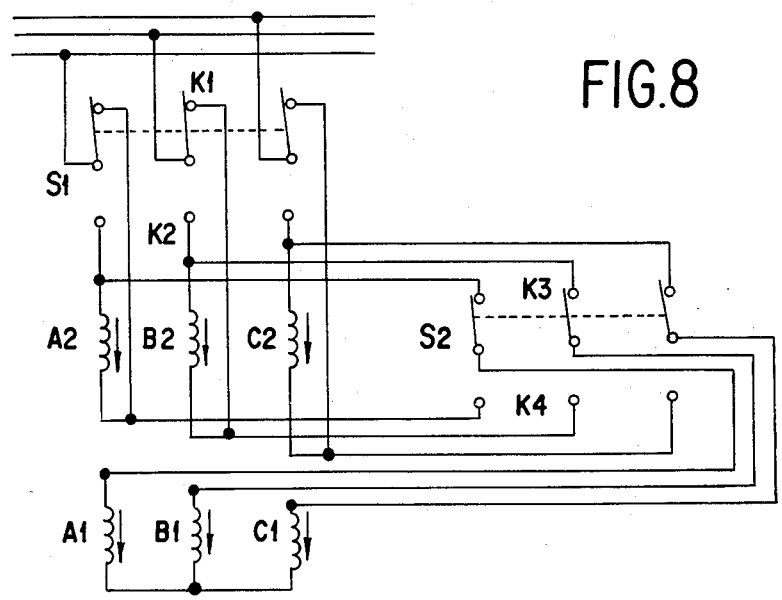
FIG. 8 is an inverse series—normal series double star connection stator winding for harmonic starting.

6. Inverse series—normal series starting mode—The double star normal series connections of FIG. 3 may be rearranged to a double star inverse series connection for starting, so that the inverse series—normal series star connection for harmonic starting shown in FIG. 8, is obtained. The starting procedure is as follows: the switch S2 is closed to K3 at first, thus the first part (A1, B1, C1) and the second part (A2, B2, C2) form an "inverse series connection". Then, the switch S1 is closed to K1, i.e., switched on line. The motor starts and is speeded up or accelerated by the starting harmonics. When the speed is approaching its rated value, the switch S1 is thrown to K2 so that the second part (A2, B2, C2) is turned off from the line, but the first part is still connected on line. The working wave and the starting harmonics produced by said first part will speed up the motor further. Finally, the switch S2 is thrown to K4. The second part (A2, B2, C2) and the first part (A1, B1, C1) form a "normal series connection" while the starting harmonics are completely eliminated. The motor then runs under the working wave normally. The advantages of this starting mode are that the starting torque is large and the number of the switches needed is one less than that of the parallel starting i.e., only two three-pole double-throw switches are needed.

(II) Several connection modes of the stator winding for harmonic starting:

To obtain difference starting modes, there are a variety of connection modes of the stator winding of a motor started by harmonics. Several preferred embodiments of the winding connection modes will be given below in terms of the number of slots and poles. Most of the embodiments listed below are two layer windings with elements of the same shape. Each slot number represents a coil, a positive slot number represents the normal series connected coil and a negative slot number represents the inverse series connected coil. Only a few of the examples may have either a two-layer or a single-layer winding. If a single-layer winding is used, each slot number represents an edge of the coil, wherein the positive ones represent the edges of coils from the front to the rear of the motor and the negative ones represent the edges of the coils from the rear to the front. Therefore, one positive slot number and a negative slot number form a coil.

1. All stator windings having even numbers of slots connected normally in a 60° phase belt, can be divided into two parts whereby any of the series starting modes, parallel starting mode, inverse parallel—normal parallel connection starting mode, inverse series—normal series connection starting moe can be used to carry out harmonic starting. The slot numbers connected in series in each phase of each part for the usually used number of slots and poles will be listed below and the number of poles of the starting harmonics as well. Symbol $Z_1$ represents the number of slots and 2P is the number of poles of the fundamental wave, that is the number of poles of the motor running normally. 2Q is the number of poles of the starting harmonic. A1, B1, C1 represents the first part of the three-phase winding and A2, B2, C2 represents the second part of the three-phase winding.

(1) $Z_1=18$, $2P=2$, $2Q=4$
   A1: 1, 2, 3;
   B1: 7, −17, −18;
   C1: −4, −5, 15;
   A2: −10, −11, −12;
   B2: 8, 9, −16;
   C2: −6, 13, 14

(2) $Z_1=24$, $2P=2$, $2Q=4$
   A1: 1, 2, 3, 4;
   B1: 9, −22, −23, −24;
   C1: −5, −6, −7, 20;
   A2: −13, −14, −15, −16;
   B2: 10, 11, 12, −21;
   C2: −8, 17, 18, 19

(3) $Z_1=24$, $2P=4$, $2Q=2$ may utilize either a single or a two-layer winding.
A1: 1, 2, −19, −20;
B1: 6, 17, −23, −24;
C1: −4, −15, 21, 22;
A2: −7, −8, 13, 14;
B2: 5, −11, −12, 18;
C2: −3, 9, 10, −16

Another embodiment is $2Q=2, 6$, that is, there are two starting harmonics, one with two poles, the other with 6 poles. The slot numbers for the three phases are as follows:
A1: 1, 2, −7, −8
B1: 5, 6, −11, −24;
C1: −3, −4, 9, 22;
A2: 13, 14, −19−20;
B2: −12, 17, 18, −23;
C2: 10, −15, −16, 21

(4) $Z_1=30$, $2P=2$, $2Q=4$
A1: 1, 2, 3, 4, 5;
B1: 11, −27, −28, −29, −30;
C1: −6, −7, −8, 24, 25;
A2: −16, −17; −18, −19, −20;
B2: 12, 13, 14, 15, −26;
C2: −9, −10, 21, 22, 23

(5) $Z_1=36$, $2P=2$, $2Q=4$
A1: 1, 2, 3, 4, 5, 6;
B1: 13, 14, 33, −34, −35, −36;
C1: −7, −8, −9, −10, 29, 30;
A2: −19, −20, −21, −22, −23, −24;
B2: 15, 16, 17, 18, −31, −32;
C2: −11, −12, 25, 26, 27, 28

(6) $Z_1=36$, $2P=4$, $2Q=2$ may use either a single or a two-layer winding.
A1: 1, 2, 3, −28, −29, −30;
B1: 9, 25, 26, −34, −35, −36;
C1: −5, −6, −22, 31, 32, 33;
A2: −10, −11, −12, 19, 20, 21;
B2: 7, 8, −16, −17, −18, 27;
C2: −4, 13, 14, 15, −23, −24

Another embodiment, $2Q=2, 6$ may also use a single or a two-layer winding, wherein the slot numbers of the three phases are as follows:
A1: 1, 2, 3, −10−11, −12;
B1: 7, 8, 9, −16, −35, −36;
C1: −4, −5, −6, 13, 14, 33;
A2: 19, 20, 21, −28, −29, −30;
B2: −17, −18, 25, 26, 27, −34;
C2: 15, −22, −23, −24, 31, 32

(7) $Z_1=36$, $2P=6$, $2Q=4$
A1: 1, 2, 25, 26, −31, −32;
B1: 6, −23, 29, 30, −35, −36;
C1: −4, 21, −27, −28, 33, 34;
A2: −7, −8, 13, 14, −19, −20;
B2: 5, −11, −12, 17, 18, −24;
C2: −3, 9, 10, −15, −16, 22

Another embodiment is $2Q=4, 8$, wherein the slot numbers of the three phases are as follows:
A1: 1, 2, −7, −8, 13, −32;
B1: 5, 6, −11, 30, −35, −36;
C1: −3, −4, 9, 10, 33, 34;
A2: 14, −19, −20, 25, 26, −31;
B2: −12, 17, 18, −23, −24, 29;
C2: −15, −16, 21, 22, −27, −28

(8) $Z_1=42$, $2P=2$, $2Q=4$
A1: 1, 2, 3, 4, 5, 6, 7;
B1: 15, 16, −38, −39, −40, −41, −42;
C1: −8, −9, −10, −11, −12, 34, 35;
A2: −22, −23, −24, −25, −26, −27, −28;
B2: 17, 18, 19, 20, 21, −36, −37;
C2: −13, −14, 29, 30, 31, 32, 33

(9) $Z_1=48$, $2P=4$, $2Q=2$ may use either a single or a two-layer winding.
A1: 1, 2, 3, 4, −37, −38, −39, −40;
B1: 11, 12, 33, 34, −45, −46, −47, −48;
C1: −7, −8, −29, −30, 41, 42, 43, 44;
A2: −13, −14, −15, −16, 25, 26, 27, 28;
B2: 9, 10, −21, −22, −23, −24, 35, 36;
C2: −5, −6, 17, 18, 19, 20, −31, −32

Another embodiment $2Q=2, 6$ may also use either a single or a two-layer winding, wherein the slot numbers of the three phases are as follows:
A1: 1, 2, 3, 4, −13, −14, −15, −16;
B1: 9, 10, 11, 12, −21, −22, −47, −48;
C1: −5, −6, −7, −8, 17, −18, −19, 44;
A2: 25, 26, 27, 28, −37, −38, −39, −40;
B2: −23, −24, 33, 34, 35, 36, −45, −46;
C2: −29, −30, −31, −32, 41, 42, 43, 20

(10) $Z_1=48$, $2P=8$, $2Q=6$ may utilize either a single or a two-layer winding.
A1: 1, 2, −31, −32, 37, 38, −43, −44;
B1: 6, 29, −35, −36, 41, 42, −47, −48
C1: −4, −27, 33, 34, −39, −40, 45, 46;
A2: −7, −8, 13, 14, −19, −20, 25, 26;
B2: 5, −11, −12,, 17, 18, −23, −24, 30;
C2: −3, 9, 10, −15, −16, 21, 22, −28

Another embodiment $2Q=6, 10$ may use either a single or a two-layer winding, wherein the slot numbers of the three phases are as follows:
A1: 1, 2, −7, −8, 13, 14, −19, −20;
B1: 5, 6, −11, −12, 17, 18, −23, −48;
C1: −3, −4, 9, 10, −15, −16, 21, 46;
A2: 25, 26, −31, −32, 37, 38, −43, −44;
B2: 29, 30, −35, −36, 41, 42, −24, −47;
C2: 22, −27, −28, 33, 34, −39, −40, 45

(11) $Z_1=54$, $2P=6$, $2Q=4$
A1: 1, 2, 3, 37, 38, 39, −46, −47, −48;
B1: 9, −34, −35, 43, 44, 45, −52, −53, −54;
C1: −5, −6, 31, −40, −41, −42, 49, 50, 51;
A2: −10, −11, −12, 19, 20, 21, −28, −29, −30;
B2: 7, 8, −16, −17, −18, 25, 26, 27, −36;
C2: −4, 13, 14, 15, −22, −23, −24, 32, 33

Another embodiment is $2Q=4, 8$ wherein the slot numbers of the three phases are as follows:
A1: 1, 2, 3, −10, −11, −12, 19, 20, 21;
B1: 7, 8, 9, −16, −17, −18, 25, −53, −54;
C1: −4, −5, −6, 13, 14, 15, −22, −23, 51;
A2: −28, −29, −30, 37, 38, 39, −46, −47, −48;
B2: 26, 27, −34, −35, −36, 43, 44, 45, −52;
C2: −24, 31, 32, 33, −40, −41, −42, 49, 50

(12) $Z_1=54$, $2P=8$, $2Q=6$
A1=1, 2, 3, −35, −36, 42, 43, −49, −50;
B1: 7, 33, −40, −41, 46, 47, 48, −53, −54;
C1: −4, −5, 37, 38, 39, −44, −45, 51, 52;
A2: −8, −9, 15, 16, −22, −23, 28, 29, 30;
B2: 6, −13, −14, 19, 20, 21, −26, −27, 34;
C2: 10, 11, 12, −17, −18, 24, 25, −31, −32

Another embodiment is $2Q=6, 10$ wherein the slot numbers of the three phases are as follows:
A1: 1, 2, 3, −8, −9, 15, 43, −49, −50;
B1: 6, 7, −13, 19, −41, 47, 48, −53, −54;
C1: −4, −5, 10, 11, −17, 39, −45, 51, 52;
A2: 16, −22, −23, 28, 29, 30, −35, −36, 42;
B2: −14, 20, 21, −26, −27, 33, 34, −40, 46;
C2: 12, −18, 24, 25, −31, −32, 37, 38, −44

(13) $Z_1=60$, $2P=4$, $2Q=2$, may use either a single or a two-layer winding
  A1: 1, 2, 3, 4, 5, −46, −47, −48, −49, −50;
  B1: 14, 15, 41, 42, 43, −56, −57, −58, −59, −60;
  C1: −8, −9, −10, −36, −37, 51 52, 53, 54, 55;
  A2: −16, −17, −18, −19, −20, 31, 32, 33, 34, 35;
  B2: 11, 12, 13, −26, −27, −28, −29, −30, 44, 45;
  C2: −6, −7, 21, 22, 23, 24, 25, −38, −39, −40

Another embodiment 2Q=2, 6 may use either a single- or a two-layer winding, wherein the slot numbers of the three phases are as follows:
  A1: 1, 2, 3, 4, 5, −16, −17, −18, −19, −20;
  B1: 11, 12, 13, 14, 15, −26, −27, −58, −59, −60;
  C1: −6, −7, −8, −9, −10, 21, 22, 23, 54, 55;
  A2: 31, 32, 33, 34, 35, −46, −47, −48, −49, −50;
  B2: −28, −29, −30, 41, 42, 43, 44, 45, −56, −57;
  C2: 24, 25, −36, −37, −38, −39, −40, 51, 52, 53

(14) $Z_1=60$, $2P=8$, $2Q=6$
  A1: 1, 2, 3, −39, −40, 46, 47, 48, −54, −55;
  B1: 8, 36, 37, −44, −45, 51, 52, 53, −59, −60;
  C1: −4, −5, 41, 42, 43, −49, −50, 56, 57, 58;
  A2: −9, −10, 16, 17, 18, −24, −25, 31, 32, 33;
  B2: 6, 7, −14, −15, 21, 22, 23, −29, −30, 38;
  C2: 11, 12, 13, −19, −20, 26, 27, 28, −34, −35

Another embodiment is 2Q=6, 10, wherein the slot numbers of the three phases are as follows:
  A1: 1, 2, 3, −9, −10, 16, 17, 18, −24, −55;
  B1: 6, 7, 8, −14, −15, 21, 22, 53, −59, −60;
  C1: −4, −5, 11, 12, 13, −19, −20, 26, 57, 58;
  A2: −25, 31, 32, 33, −39, −40, 46, 47, 48, −54;
  B2: 23, −29, −30, 36, 37, 38, −44, −45, 51, 52;
  C2: 27, 28, −34, −35, 41, 42, 43, −49, −50, 56

(15) $Z_1=60$, $2P=10$, $2Q=8$
  A1: 1, 2, 37, 38, −43, −44, 49, 50, −55, −56;
  B1: 6, −35, 41, 42, −47, −48, 53, 54, −59, −60;
  C1: −4, 33, −39, −40, 45, 46, −51, −52, 57, 58;
  A2: −7, −8, 13, 14, −19, −20, 25, 26, −31, −32;
  B2: 5, −11, −12, 17, 18, −23, −24, 29, 30, −36;
  C2: −3, 9, 10, −15, −16, 21, 22, −27, −28, 34

Another embodiment is 2Q=8, 12 wherein the slot numbers of the three phases are as follows:
  A1: 1, 2, −7, −8, 13, 14, −19, −20, 25, −56;
  B1: 5, 6, −11, −12, 17, 18, −23, −24, −59, −60;
  C1: −3, −4, 9, 10, −15, −16, 21, 22, −27, 58;
  A2: 26, −31, −32, 37, 38, −43, −44, 49, 50, −55;
  B2: 29, 30, −35, −36, 41, 42, −47, −48, 53, 54;
  C2: −28, 33, 34, −39, −40, 45, 46, −51, −52, 57

(16) $Z_1=72$, $2P=6$, $2Q=4$
  A1: 1, 2, 3, 4, 49, 50, 51, 52, −61, −62, −63, −64;
  B1: 11, 12, −45, −46, 57, 58, 59, 60, −69, −70, −71, −72;
  C1: −6, −7, −8, 41, −53, −54, −55, −56, 65, 66, 67, 68;
  A2: −13, −14, −15, −16, 25, 26, 27, 28, −37, −38, −39, −40;
  B2: 9, 10, −21, −22, −23, −24, 33, 34, 35, 36, −47, −48;
  C2: −5, 17, 18, 19, 20, −29, −30, −31, −32, 42, 43, 44

Another embodiment is 2Q=4, 8 wherein the slot numbers of the three phases are follows:
  A1: 1, 2, 3, 4, −13, −14, −15, −16, 25, 26 −63, −64;
  B1: 9, 10, 11, 12, −21, −22, −23, −24, 60, −69, −70, −71, −72;
  C1: −5, −6, −7, −8, 17, 18, 19, 20, −29, 66, 67, 68;
  A2: 27, 28, −37, −38, −39, −40, 49, 50, 51 52, −61, −62;
  B2: −24, 33, 34, 35, 36, −45; −46, −47, −48, 57, 58, 59;
  C2: −30, −31, −32, 41, 42, 43, 44, −53, −54, −55, −56, 65

(17) $Z_1=72$, $2P=8$, $2Q=6$
  A1: 1, 2, 3, −46, −47, −48, 55, 56, 57, −64, −65, −66;
  B1: 9, 43, 44, −52, −53, −54, 61, 62, 63, −70, −71, −72;
  C1: −5, −6, −40, 49, 50, 51, −58, −59, −60, 67, 68, 69;
  A2: −10, −11, −12, 19, 20, 21, −28, −29, −30, 37, 38, 39;
  B2: 7, 8, −16, −17, −18, 25, 26, 27, −34, −35, −36, 45;
  C2: −4, 13, 14, 15, −22, −23, −24, 31, 32, 33, −41, −42

Another embodiment is 2Q=6, 10 wherein the slot numbers of the three phases are as follows:
  A1: 1, −30, 38, 39, −46, −47, −48, 55, 56, 57, −64, −65;
  B1: −35, −36, 43, 44, 45, −52, −53, −54, 61, 62, 63, −70;
  C1: 33, −40, −41, −42, 49, 50, 51, −58, −59, −60, 67, 68;
  A2: 2, 3, −10, −11, −12, 19, 20, 21, −28, −29, 37, −66;
  B2: 7, 8, 9, −16, −17, −18, 25, 26, 27, −34, −71, −72;
  C2: −4, −5, −6, 13, 14, 15, −22, −23, −24, 31, 32, 69

(18) $Z_1=90$, $2P=10$, $2Q=8$
  A1: 1, 2, 3, 55, 56, 57, −64, −65, −66, 73, 74, 75, −82, −83, −84;
  B1: 9, −52, −53, 61, 62, 63, −70, −71, −72, 79, 80, 81, −88, −89, −90;
  C1: −5, −6, 49, −58, −59, −60, 67, 68, 69, −76, −77, −78, 85, 86, 87;
  A2: −10, −11, −12, 19, 20, 21, −28, −29, −30, 37, 38, 39, −46, −47, −48;
  B2: 7, 8, −16, −17, −18, 25, 26, 27, −34, −35, −36, 43, 44, 45, −54;
  C2: −4, 13, 14, 15, −22, −23, −24, 31, 32, 33, −40, −41, −42, 50, 51

Another embodiment is 2Q=8, 12 wherein the slot numbers of the three phases are as follows:
  A1: 1, 2, 3, −10, −11, −12, 19, 20, 21, −28, −29, −30, 37, 38, −84;
  B1: 7, 8, 9, −16, −17, −18, 25, 26, 27, −34, −35, 43, 81, −89, −90;
  C1: −4, −5, −6, 13, 14, 15, −22, −23, −24, 31, 32, 33, −40, 86, 87;
  A2: 39, −46, −47, −48, 55, 56, 57, −64, −65, −66, 73, 74, 75, −82, −83;
  B2: −36, 44, 45, −52, −53, −54, 61, 62, 63, −70, −71, −72, 79, 80, −88;
  C2: −41, −42, 49, 50, 51, −58, −59, −60, 67, 68, 69, −76, −77, −78, 85

2. The stator winding connected normally with a 60° phase belt and odd number of slots per phase is only able to utilize series connection starting mode or inverse series-normal series connection starting mode to realize harmonic starting since the number of slots per phase cannot be divided into two equal parts. The slot numbers connected in series in each part of each phase and the number of poles of the starting harmonics will be given by the two embodiments listed below.
  (1) $Z_1=45$, $2P=6$, $2Q=4$ A1: 1, 2, 3, 31, 32, 33, −39, −40;
B1: 8, −29, −30, 36, 37, 38, −44, −45;
C1: −5, 26, 27, −34, −35, 41, 42, 43;
A2: −9, −10, 16, 17, 18, −24, −25;
B2: 6, 7, −14, −15, 21, 22, 23;
C2: −4, 11, 12, 13, −19, −20, 28

Another embodiment is 2Q=4, 8 wherein the slot numbers of the three phases are as follows:
A1: 1, 2, 3, −9, −10, 16, 17, 18;
B1: 6, 7 8, −14, −15, 21, −44, −45;
C1: −4, −5, 11, 12, 13, −19, 42, 43;
A2: −24, −25, 31, 32, 33, −39, −40;
B2: 22, 23, −29, −30, 36, 37, 38;
C2: −20, 26, 27, 28, −34, −35, 41

(2) $Z_1=75$, $2P=10$, $2Q=8$
A1: 1, 2, 3, −9, −10, 18, 46, −54, −55, 61, 62, 63, −69, −70;
B1: 7, 8, −15, 51, 52, 6, −59, −60, 66, 67, 68, −74, −75;
C1: −4, −5, 12, 13, −49, 56, 57, 58, −64, −65, 71, 72, 73;
A2: 16, 17, −24, −25, 31, 32, 33, −39, −40, 47, 48;
B2: −14, 21, 22, 23, −29, −30, 36, 37, 38, −44, −45, 53;
C2: 11, −19, −20, 26, 27, 28, −34, −35, 41, 42, 43, −50

Another embodiment is 2Q=8, 12 wherein the slot numbers of the three phases are as follows:
A1: 1, 2, 3, −9, −10, 16, 17, 18, −24, −25, 31, 63, −69, −70;
B1: 6, 7, 8, −14, −15, 21, 22, 23, −29, −60, 67, 68, −74, −75;
C1: −4, −5, 11, 12, 13, −19, −20, 26, 27, 58, −65, 71, 72, 73;
A2: 32, 33, −39, −40, 46, 47, 48, −54, −55, 61, 62;
B2: −30, 36, 37, 38, −44, −45, 51, 52, 53, −59, 66;
C2: 28, −34, −35, 41, 42, 43, −49, −50, 56, 57, −64

3. When a 4Y−3Y connection is used for realizing harmonic starting, the stator winding is divided into 12 sections: A1, A2, A3, A4, B1, B2, B3, B4, C1, C2, C3, C4, as shown in FIG. 4. The three-phase switch is closed to K1 during starting and changes to K2 when the motor finishes starting. The slot numbers connected in series in each section of the winding according to the direction of the arrows shown in FIG. 4 will be given by the two examples listed below, wherein a positive number illustrates normal series connection and a negative number illustrates inverse series connection.

(1) $Z_1=36$, $2P=4$, $2Q=6$
A1: 1, 2, 3;
A2: −11, −12, 19;
A3: 21, −28, −29;
A4: −10, 20, −30;
B1: 25, 26, 27;
B2: 7, −35, −36;
B3: 9, −16, −17;
B4: 8, −18, −34;
C1: 13, 14, 15;
C2: −23, −24, 31;
C3: −4, −5, 33;
C4: −6, −22, 32.

(2) $Z_1=72$, $2P=8$, $2Q=6$
A1: 1, 2, 3, −64, −65, −66;
A2: 37, 38, −46, −47, −48, 57;
A3: −10, 19, 20, 21, −29, −30;
A4: −11, −12, −28, 39, 55, 56;
B1: −16, −17, −18, 25, 26, 27;
B2: 9, 61, 62, −70, −71, −72;
B3: −34, 43, 44, 45, −53, −54;
B4: 7, 8, −35, −36, −52, 63;
C1: −40, −41, −42, 49, 50, 51,;
C2: 13, 14, −22, −23, −24, 33;
C3: −5, −6, −58, 67, 68, 69;
C4: −4, 15, 31, 32, −59, −60.

4. When a (3+Y)−3Y connection is used for realizing harmonic starting, the stator winding is divided into 12 sections: A0, A1, A2, A3, B0, B1, B2, B3, C0, C1, C2, C3, shown in FIG. 5. The slot numbers connected in series in each section of the winding according to the direction of the arrows shown in FIG. 5 will be explained by two examples listed below.

(1) $Z_1=36$, $2P=6$, $2Q=4$
A0: −8, −20, −32;
A1: 1, 2, 3;
A2: 25, 26, 27;
A3: 13, 14, 15;
B0: 6, 18, 30;
B1: −11, −12, 19;
B2: 7, −35, −36;
B3: −23, −24, 31;
C0: 10, 22, 34;
C1: 21, −28, −29;
C2: 9, −16, −17;
C3: −4, −5, 33.

(2) $Z_1=72$, $2P=6$, $2Q=8$
A0: 4, −15, 28, −39, 52, −63;
A1: 1, 2, 3, −64, −65, −66;
A2: −16, −17, −18, 25, 26, 27;
A3: −40, −41, −42, 49, 50, 51;
B0: 11, 12, 35, 36, 59, 60;
B1: 37, 38, −46, −47, −48, 57;
B2: 9, 61, 62, −70, −71, −72;
B3: 13, 14, −22, −23, −24, 33;
C0: −7, −8, −31, −32, −55, −56;
C1: −10, 19, 20, 21, −29, −30;
C2: −34, 43, 44, 45, −53, −54;
C3: −5, −6, −58, 67, 68, 69.

(III) Several modes for connection of the rotor winding of a wound-rotor asynchronous motor for harmonic starting are as follows: The rotor winding of a wound-rotor asynchronous motor for harmonic starting is designed so that the current induced by the starting harmonics must flow through the starting resistors to form a path, while the current induced by the working wave will not flow through the starting resistors to form short-circuit closed loop. There are a variety of rotor windings to realize such a design. The preferred ones will be given below.

Figure 9:
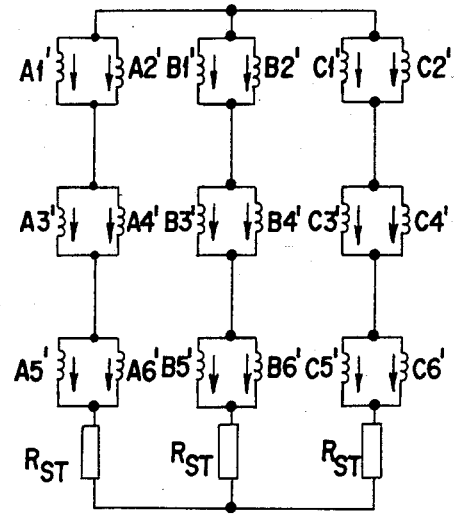
FIG. 9 is a three-phase star connection rotor winding with one starting harmonic only.
Figure 10:
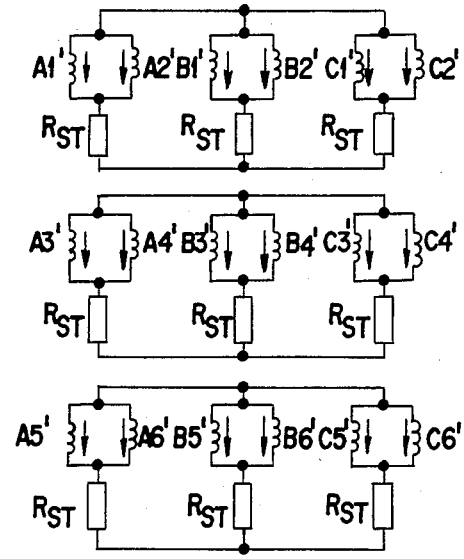
FIG. 10 is a three-phase star connection rotor winding with two starting harmonics.

1. Three-phase star connection—The rotor winding is divided into 18 sections: A1', A2', A3', A4', A5', A6', B1', B2', B3', B4', B5', B6', C1', C2', C3', C4', C5', C6'. When a single starting harmonic exists, there needs to be three starting resistors $R_{st}$ as shown in FIG. 9. When there are two starting harmonics, nine starting resistors $R_{st}$ are needed as shown in FIG. 10.

This kind of connection can be used for many cases, for example, when 2P=6, 2Q=4 or 2Q=4, 8 this connection is used for all the number of slots of rotor $Z_2=36$, 54, 72, 90, . . . , that is, $Z_2=36+18n$, where n=0, 1, 2, 3, . . . , . The slot numbers connected in series of each section of the winding will be given by four examples listed below.

(1) $Z_2=36$, $2P=6$, $2Q=4$ or $2Q=4, 8$
A1': 1, 2;
A2': 19, 20;
A3': 3; 4;

A4': 21, 22;
A5': −11, −12;
A6': −29, −30;
B1': 7, 8;
B2': 25, 26;
B3': 9, 10;
B4': 27, 28;
B5': −17, −18;
B6': −35, −36;
C1': 13, 14;
C2': 31, 32;
C3': 15, 16;
C4': 33, 34;
C5': −5, −6;
C6': −23, −24.

(2) $Z_2=54$, $2P=6$, $2Q=4$ or $2Q=4, 8$
A1': 1, 2, 3;
A2': 28, 29, 30;
A3': 4, 5, 6;
A4': 31, 32, 33;
A5': −16, −17, −18;
A6': −43, −44, −45;
B1': 10, 11, 12;
B2': 37, 38, 39;
B3': 13, 14, 15;
B4': 40, 41, 42;
B5': −25, −26, −27;
B6': −52, −53, −54;
C1': 19, 20, 21;
C2': 46, 47, 48;
C3': 22, 23, 24;
C4': 49, 50, 51;
C5': −7, −8, −9;
C6': −34, −35, −36.

Figure 11:
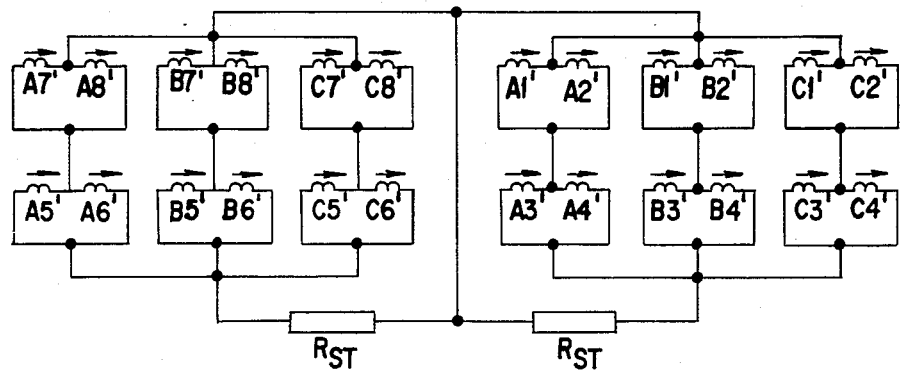
FIG. 11 is a two-phase star connection rotor winding with one starting harmonic.
Figure 12:
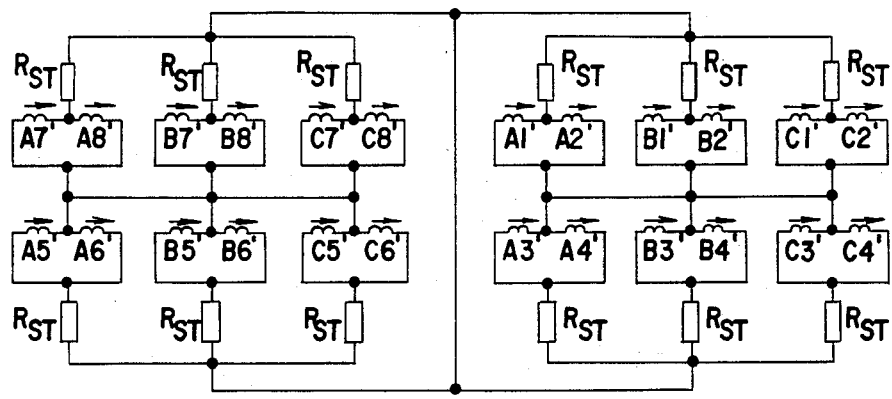
FIG. 12 is a two phase star connection rotor winding with two starting harmonics.

(3) $Z_2=72$, $2P=6$, $2Q=4$ or $2Q=4, 8$
A1': 1, 2, 3, 4;
A2': 37, 38, 39, 40;
A3': 5, 6, 7, 8;
A4': 41, 42, 43, 44;
A5': −21, −22, −23, −24;
A6': −57, −58, −59, −60;
B1': 13, 14, 15, 16;
B2': 49, 50, 51, 52;
B3': 17, 18, 19, 20;
B4': 53, 54, 55, 56;
B5': −33, −34, −35, −36;
B6': −69, −70, −71, −72;
C1': 25, 26, 27, 28;
C2': 61, 62, 63, 64;
C3': 29, 30, 31, 32;
C4': 65, 66, 67, 68;
C5': −9, −10, −11, −12;
C6': −45, −46, −47, −48;

(4) $Z_2=90$, $2P=6$, $2Q=4$, or $2Q=4, 8$
A1': 1, 2, 3, 4, 5;
A2': 46, 47, 48, 49, 50;
A3': 6, 7, 8, 9, 10;
A4': 51, 52, 53, 54, 55;
A5': −26, −27, −28, −29, −30;
A6': −71, −72, −73, −74, −75;
B1': 16, 17, 18, 19, 20;
B2': 61, 62, 63, 64, 65;
B3': 21, 22, 23, 24, 25;
B4': 66, 67, 68, 69, 70;
B5': −41, −42, −43, −44, −45;
B6': −86, −87, −88, −89, −90;
C1': 31, 32, 33, 34, 45;
C2': 76, 77, 78, 79, 80;
C3': 36, 37, 38, 39, 40;
C4': 81, 82, 83, 84, 85;
C5': −11, −12, −13, −14, −15;
C6': −56, −57, −58, −59, −60;

2. Two-phase star connection—The rotor winding is divided into 24 sections: A1', A2', A3', A4', A5', A6', A7', A8', B1', B2', B3', B4', B5', B6', B7', B8', C1', C2', C3', C4', C5', C6', C7', C8'. When there is one starting harmonic only, two starting resistors $R_{st}$ are needed for the connection shown in FIG. 11. When there are two starting harmonics, 12 starting resistors $R_{st}$ are needed for the connection of FIG. 12. Such a connection mode adapts to many cases, for example, $2P=8$, $2Q=6$ or $2Q=6, 10$ and the connection mode is used for all the numbers of rotor-slots $Z_2=24+12n$, wherein $n=0, 1, 2, 3, \ldots$. The slot number connected in series with the 24 sections of the winding will be given by four examples listed below.

(1) $Z_2=36$, $2P=8$, $2Q=6$ or $2Q=6, 10$
A1': 1, 2;
A2': 19, 20;
A3': 3; A4': 21;
A5': 4, 5;
A6': 22, 23;
A7': 6;
A8': 24;
B1': 13, 14;
B2': 31, 32;
B3': 15;
B4': 33;
B5': 16, 17;
B6': 34, 35;
B7': 18;
B8': 36;
C1': 25, 26;
C2': 7, 8;
C3': 27;
C4': 9;
C5': 28, 29;
C6': 10, 11;
C7': 30;
C8': 12.

(2) $Z_2=48$, $2P=8$, $2Q=6$ or $2Q=6, 10$
A1': 1, 2,
A2': 25, 26;
A3': 3, 4;
A4': 27, 28;
A5': 5, 6;
A6': 29, 30;
A7': 7, 8;
A8': 31, 32;
B1': 17, 18;
B2': 41, 42;
B3': 19, 20;
B4': 43, 44;
B5': 21, 22;
B6': 45, 46;
B7': 23, 24;
B8': 47, 48;
C1': 33, 34;
C2': 9, 10;
C3': 35, 36;
C4': 11, 12;
C5': 37, 38;
C6': 13, 14;
C7': 39, 40;
C8': 15, 16.

(3) $Z_2=84$, $2P=8$, $2Q=6$ or $2Q=6, 10$

A1': 1, 2, 3, 4;
A2': 43, 44, 45, 46;
A3': 5, 6, 7;
A4': 47, 48, 49;
A5': 8, 9, 10, 11;
A6': 50, 51, 52, 53;
A7': 12, 13, 14;
A8': 54, 55, 56;
B1': 29, 30, 31, 32;
B2': 71, 72, 73, 74;
B3': 33, 34, 35;
B4': 75, 76, 77, ;
B5': 36, 37, 38, 39;
B6': 78, 79, 80, 81;
B7': 40, 41, 42;
B8': 82, 83, 84;
C1': 57, 58, 59, 60;
C2': 15, 16, 17, 18;
C3': 61, 62, 63;
C4': 19, 20, 21;
C5': 64, 65, 66, 67;
C6': 22, 23, 24, 25;
C7': 68, 69, 70;
C8': 26, 27, 28.

(4) $Z_2=96$, $2P=8$, $2Q=6$ or $2Q=6, 10$
A1': 1, 2, 3, 4;
A2': 49, 50, 51, 52;
A3': 5, 6, 7, 8;
A4': 53, 54, 55, 56;
A5': 9, 10, 11, 12;
A6': 57, 58, 59, 60;
A7': 13, 14, 15, 16;
A8': 61, 62, 63, 64;
B1': 33, 34, 35, 36;
B2': 81, 82, 83, 84;
B3': 37, 38, 39, 40;
B4': 85, 86, 87, 88;
B5': 41, 42, 43, 44;
B6': 89, 90, 91, 92;
B7': 45, 46, 47, 48;
B8': 93, 94, 95, 96;
C1': 65, 66, 67, 68;
C2': 17, 18, 19, 20;
C3': 69, 70, 71, 72;
C4': 21, 22, 23, 24;
C5': 73, 74, 75, 76;
C6': 25, 26, 27, 28;
C7': 77, 78, 79, 80;
C8': 29, 30, 31, 32;

3. Five-phase star connection—The rotor winding is divided into 30 sections: A1', A2', A3', A4', A5', A6', B1', B2', B3', B4', B5', B6', C1', C2', C3', C4', C5', C6', D1', D2', D3', D4', D5', D6', E1', E2', E3', E4', E5', E6'. When there is one starting harmonic only five starting resistors $R_{st}$ are needed for the connection shown in FIG. 13. When there are two starting harmonics, fifteen starting resistors $R_{st}$ are needed for the connection shown in FIG. 14. The other five-phase star circuit of the rotor winding is divided into 40 sections: A1', ... A8', B1', ... B8', C1', ... C8', D1', ... D8', E1', ... E8'. When there is one starting harmonic only five starting resistors $R_{st}$ are needed for the connection shown in FIG. 15. When there are two starting harmonics, only ten starting resistors $R_{st}$ are needed for the connection shown in FIG. 16.

One example for each connection mode mentioned above will be given below to indicate the slot numbers connected in series for each section.

Figure 13:
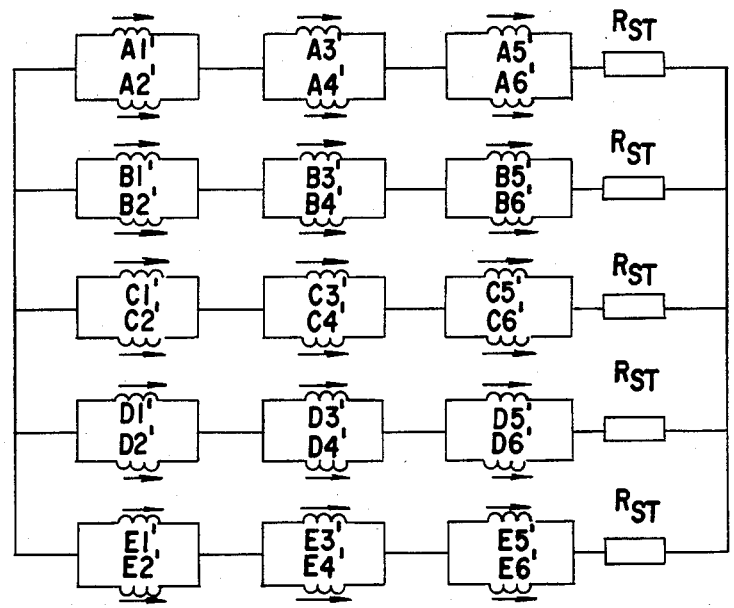
FIG. 13 is a five-phase star connection rotor winding having fifteen closed loops with one starting harmonic only.
Figure 14:
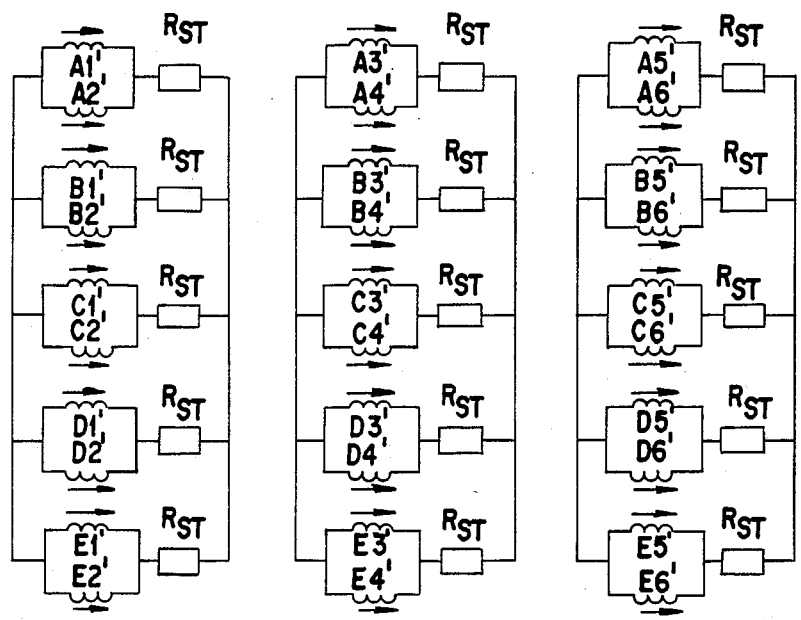
FIG. 14 is a five-phase star connection rotor winding having fifteen closed loops with two starting harmonics.

(1) $Z_2=90$, $2P=10$, $2Q=8$, in this case, the connection mode of FIG. 13 may be used; while with $2Q=8, 12$, the connection mode of FIG. 14 may be used.

Figure 15:
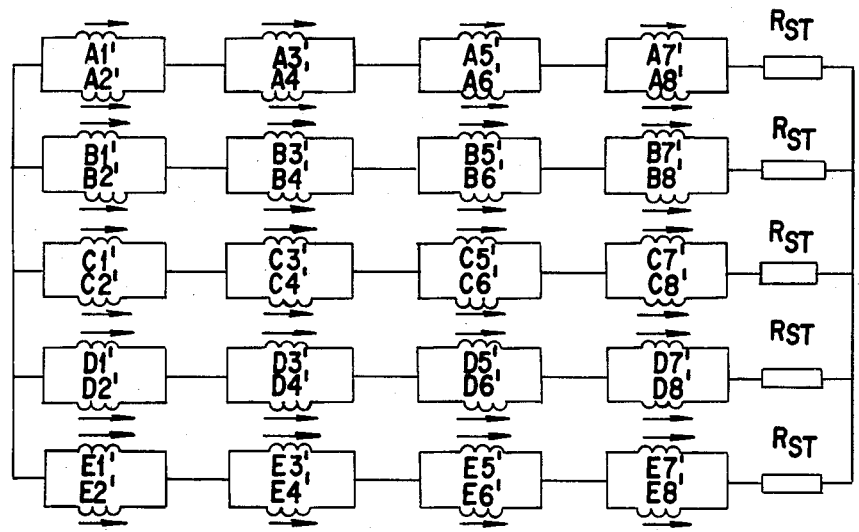
FIG. 15 is a five-phase star connection rotor winding having twenty closed loops with one starting harmonic only.
Figure 16:
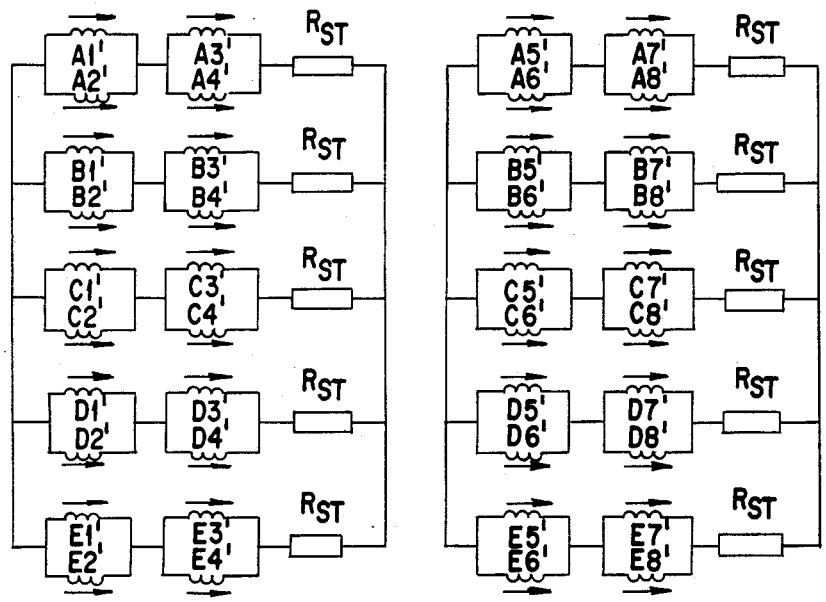
FIG. 16 is a five-phase star connection rotor winding having twenty closed loops with two starting harmonics.

The slot number for 30 sections connected in series are as follows:
A1': 1, 2, 3;
A2': 46, 47, 48;
A3': 25, 26, 27;
A4': 70, 71, 72,
A5': −13, −14, −15;
A6': −58, −59, −60;
B1': 28, 29, 30;
B2': 73, 74, 75;
B3': 7, 8, 9;
B4': 52, 53, 54;
B5': −40, −41, −42;
B6': −85, −86, −87;
C1': 10, 11, 12;
C2': 55, 56, 57;
C3': 34, 35, 36;
C4': 79, 80, 81;
C5': −22, −23; −24;
C6': −67, −68, −69;
D1': 37, 38, 39;
D2': 82, 83, 84;
D3': 16, 17, 18;
D4': 61, 62, 63;
D5': −4, −5, −6;
D6': −49, −50, −51;
E1': 19, 20, 21;
E2': 64, 65, 66;
E3': 43, 44, 45;
E4': 88, 89, 90;
E5': −31, −32, −33;
E6': −76, −77, −78;

(2) For $Z_2=120$, $2P=10$, $2Q=8$, the connection of FIG. 15 may be used. For $2Q=8, 12$, the connection of FIG. 16 may be used. The slot numbers connected in series of each section are as follows:
A1': 1, 2, 3;
A2': 61, 62, 63;
A3': 4, 5, 6;
A4': 64, 65, 66;
A5': 31, 32, 33;
A6': 91, 92, 93;
A7': 34, 35, 36;
A8': 94, 95, 96;
B1': 37, 38, 39;
B2': 97, 98, 99;
B3': 40, 41, 42;
B4': 100, 101, 102;
B5': 7, 8, 9;
B6': 67, 68, 69;
B7': 10, 11, 12;
B8': 70, 71, 72;
C1': 13, 14, 15;
C2': 73, 74, 75;
C3': 16, 17, 18;
C4': 76, 77, 78;
C5': 43, 44, 45;
C6': 103, 104, 105;
C7': 46, 47, 48;
C8': 106, 107, 108;
D1': 49, 50, 51;
D2': 109, 110, 111;
D3': 52, 53, 54;
D4': 112, 113, 114;
D5': 19, 20, 21;

D6': 79, 80, 81;
D7': 22, 23, 24;
D8': 82, 83, 84;
E1': 25, 26, 27;
E2': 85, 86, 87;
E3': 28, 29, 30;
E4': 88, 89, 90;
E5': 55, 56, 57;
E6': 115, 116, 117;
E7': 58, 59, 60;
E8': 118, 119, 120.

Figure 17:
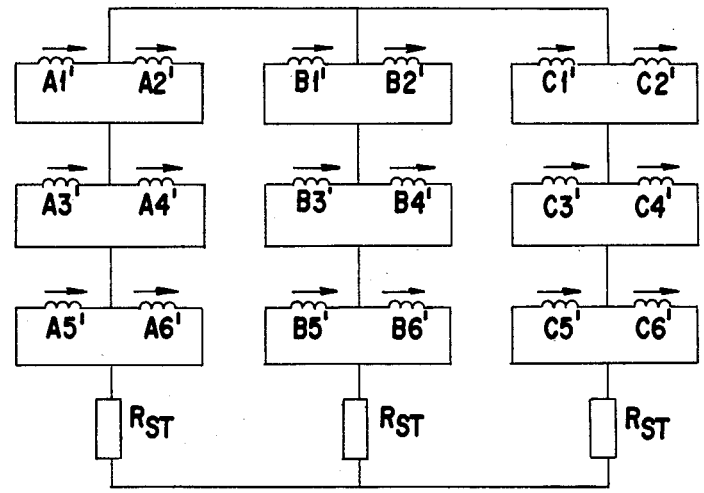
FIG. 17 is a special three-phase star connection rotor winding with one starting harmonic only.
Figure 18:
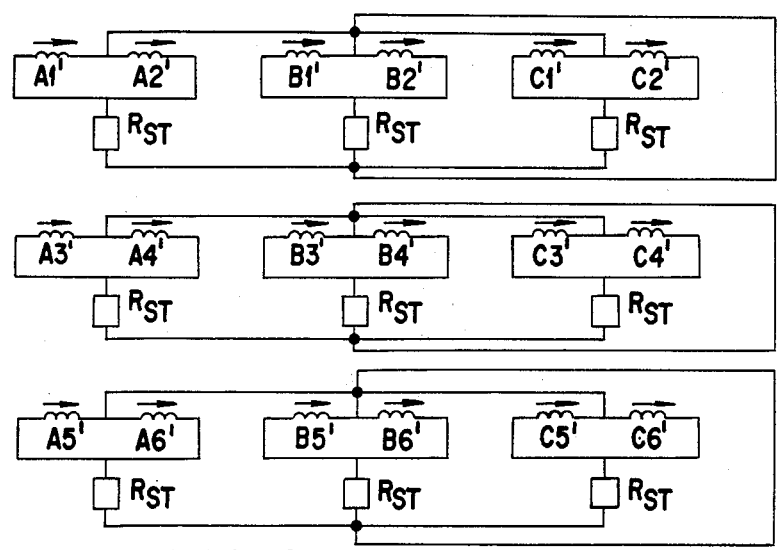
FIG. 18 is a special three-phase star connection rotor winding with two starting harmonics.

4. Special three-phase star connection—The rotor winding is divided into 18 sections: A1', A2', ... A6', B1', ... B6', C1', ... C6'. When there is only one starting harmonic, three starting resistors $R_{st}$ are needed for the connection shown in FIG. 17. When there are two starting harmonics, nine starting resistors $R_{st}$ are needed for the connection shown in FIG. 18. The slot numbers connected in series of each section will be given by an example below. $Z_2=54$, $2P=4$, $2Q=2$, in this case, the connection of FIG. 17 is used. While with $2Q=2$, 6 the connection of FIG. 18 is used.

A1': 1, 2, 3;
A2': 28, 29, 30;
A3': 4, 5, 6;
A4': 31, 32, 33;
A5': 7, 8, 9;
A6': 34, 35, 36;
B1': 19, 20, 21;
B2': 46, 47, 48;
B3': 22, 23, 24;
B4': 49, 50, 51;
B5': 25, 26, 27;
B6': 52, 53, 54;
C1': 37, 38, 39;
C2': 10, 11, 12;
C3': 40, 41, 42;
C4': 13, 14, 15;
C5': 43, 44, 45;
C6': 16, 17, 18.

Figure 20:
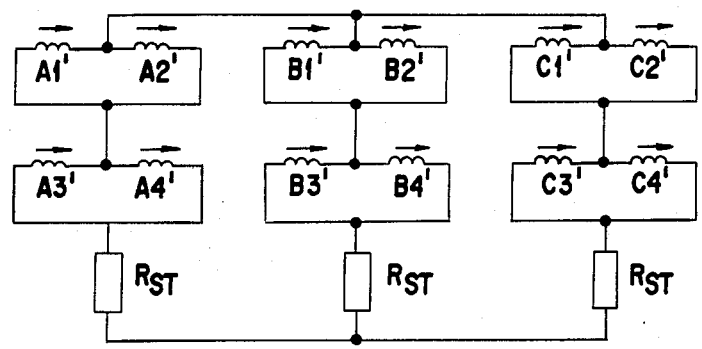
FIG. 20 is a special two-phase star connection rotor winding with one starting harmonic only.
Figure 21:
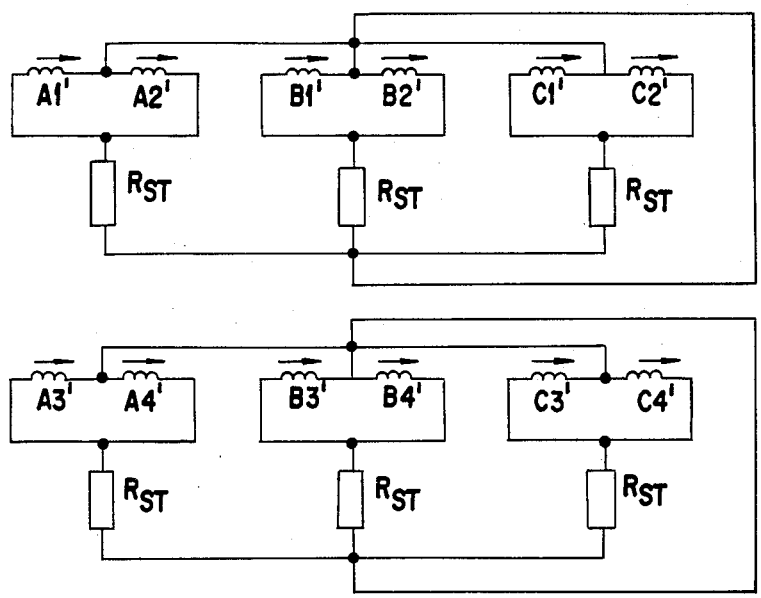
FIG. 21 is a special two-phase star connection rotor winding with two starting harmonics.

5. Special two-phase star connection—the rotor winding is divided into 12 sections: A1', ... A4', B1', ... B4', C1', ... C4'. When there is one starting harmonic only, three starting resistors $R_{st}$ are needed for the connection of FIG. 20. When there are two starting harmonics, six starting resistors $R_{st}$ are needed for the connection shown in FIG. 21. The slot numbers connected in series of each section of winding will be given below by two examples.

(1) $Z_2=36$, $2P=4$, $2Q=2$ or $2Q=2, 6$
  A1': 1, 2, 3;
  A2': 19, 20, 21;
  A3': 4, 5, 6;
  A4': 22, 23, 24;
  B1': 13, 14, 15;
  B2': 31, 32, 33;
  B3': 16, 17, 18;
  B4': 34, 35, 36;
  C1': 25, 26, 27;
  C2': 7, 8, 9;
  C3': 28, 29, 30;
  C4': 10, 11, 12.

(2) $Z_2=48$, $2P=4$, $2Q=2$ or $2Q=2, 6$
  A1': 1, 2, 3, 4;
  A2': 25, 26, 27, 28;
  A3': 5, 6, 7, 8;
  A4': 29, 30, 31, 32;
  B1': 17, 18, 19, 20;
  B2': 41, 42, 43, 44;
  B3': 21, 22, 23, 24;
  B4': 45, 46, 47, 48;
  C1': 33, 34, 35, 36;
  C2': 9, 10, 11, 12;
  C3': 37, 38, 39, 40;
  C4': 13, 14, 15, 16.

Figure 23:
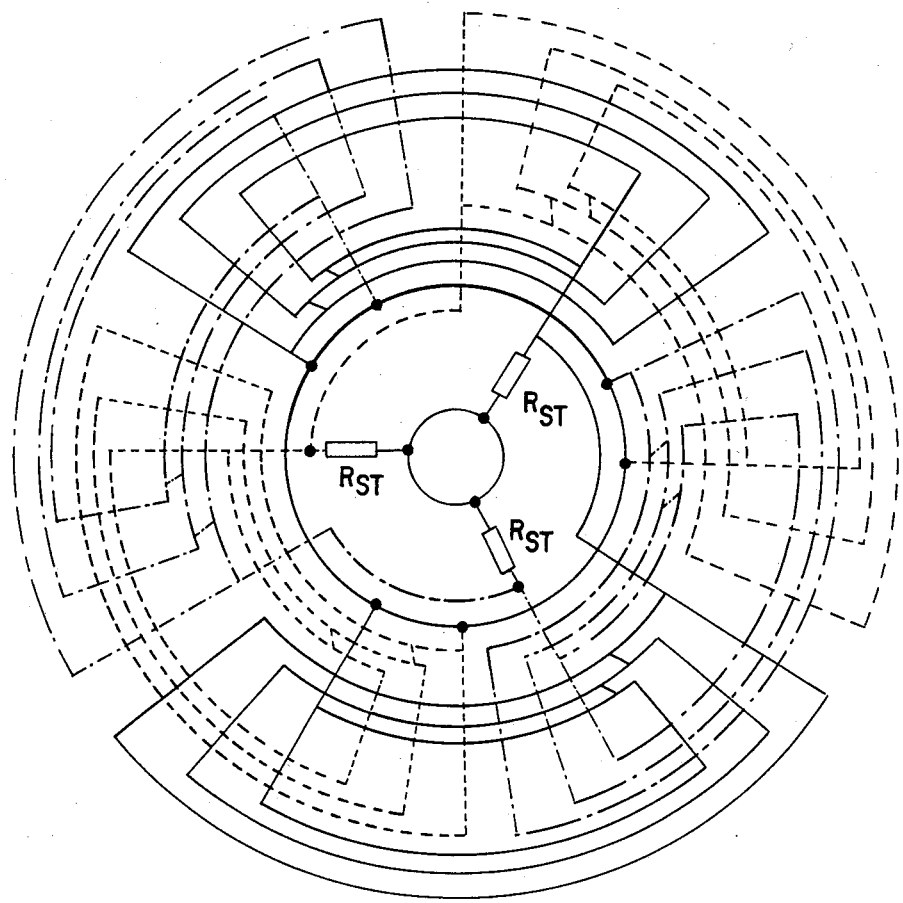
FIG. 23 shows a single layer three-phase concentric conncection rotor winding for harmonic starting $Z_2=36$, $2P=4$, $2Q=2$.

6. Three phase single-layer concentric connection—When the pole number of the working wave 2P is 4 or more, if the number of slots of each pole of the rotor $Z_2/2P$ is a multiple of three, then the single-layer winding of three-phase concentric connection can be used. For example, for $Z_2=36$, $2P=4$, $2Q=2$, the connection of FIG. 23 is used with three starting resistors.

Figure 22:
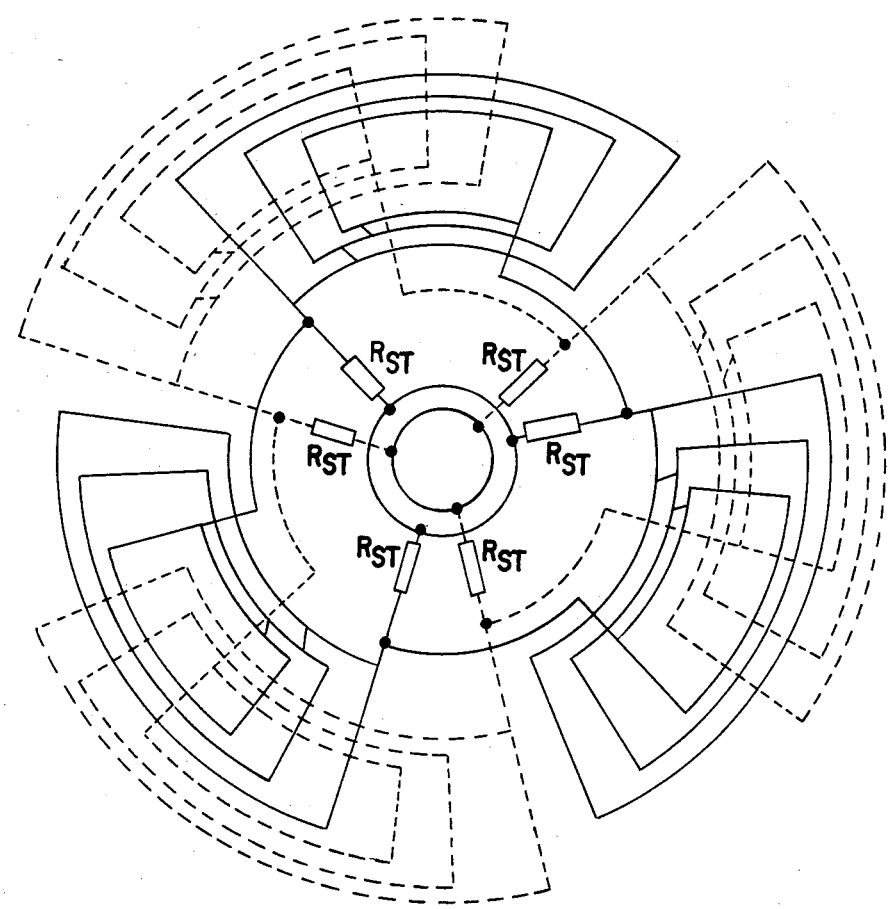
FIG. 22 shows a single layer two-phase concentric connection rotor winding for harmonic starting $Z_2=36$, $2P=6$, $2Q=4$, 8 where $2P$ is the number of poles of the fundamental wave, $2Q$ is the number of poles of the starting harmonics and $Z_2$ is the number of slots.

7. Single-layer two-phase concentric connection—When the pole number of the working wave is 4 or more than 4, and the number of slots per pole of the rotor $Z_2/2P$ is a even number, a single-layer two-phase concentric winding may be used. When $Z_2=36$, $2P=6$, $2Q=4$ or $2Q=4, 8$, for example, the connection mode of FIG. 22 is used with six starting resistors.

(IV) The connection mode of the rotor winding of a non-salient-pole synchronous motor for harmonic starting.

Figure 19:
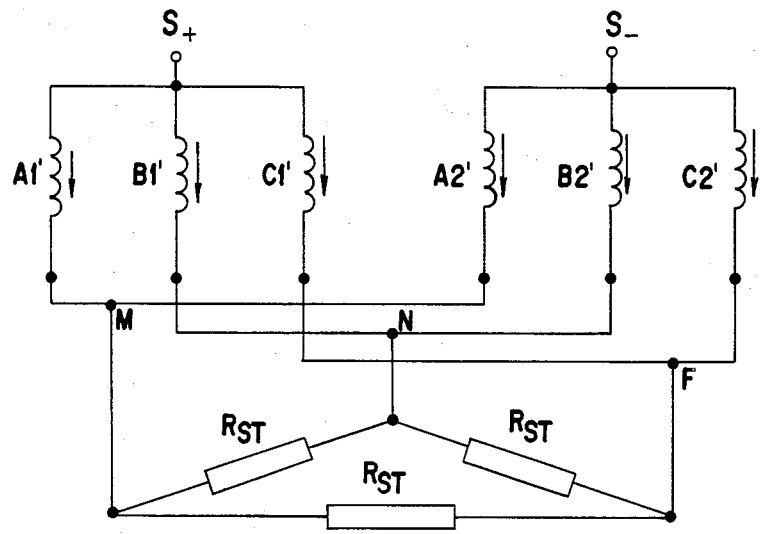
FIG. 19 shows a rotor winding connection synchronous motor for the harmonic starting.

There is only one winding on the rotor of the non-salient-pole synchronous motor for harmonic starting, on which two or more resistors are arranged as the starting resistors and two points are connected respectively to two slip rings. It is so designed that the current in the rotor induced by the starting harmonics will flow through the starting resistors to form a path, while the DC excitation current from the slip rings does not flow through the starting resistors, thereby forming its own path. In this case, it is necessary to produce a very strong magnetic field with working poles by having a DC excitation current pass through the windings. On the other hand, it is required that the electromotive forces induced in the rotor by the fundamental or working field create a polyphase current to dampen the oscillation of the motor. The preferred proposal of the connection of rotor winding to suit these requirements mentioned above is shown in FIG. 19. The rotor winding is divided into six sections A1', A2', B1', B2', C1', C2', which form two face to face star connections. There are three starting resistors $R_{st}$ connected to three nodes M, N, F in FIG. 19, while the neutral points $S_+$ and $S_-$ of the two stars are connected to slip rings respectively in order to lead a DC excitation current in. The foregoing three starting resistors may be connected with the rotor winding and fixed thereon. There are only two slip rings in this case, therefore the construction is rather simple. On the other hand, three extra slip rings may be used, which are connected with the three nodes M, N, F respectively, which are connected to the starting resistors on the outside of the motor by the brushes. In this way, the starting resistors may be adjusted for starting in accordance with load connections. However, five slip rings are needed so that the construction becomes complicated. The slot numbers connected in series for each section of the winding will be explained below with four examples listed.

(1) $Z_2=54$, $2P=4$, $2Q=2$
  A1': 1, 2, 3, 4, 5, −42, −43, −44, −45;
  A2': 15, 16, 17, 18, −28, −29, −30, −31, −32;
  B1': −24, −25, −26, −27, 37, 38, 39, 40, 41;
  B2': −10, −11, −12, −13, −14, 51, 52, 53, 54;
  C1': 33, 34, 35, 36, −46, −47, −48, −49, −50;
  C2': −6, −7, −8, −9, 19, 20, 21, 22, 23;

(2) $Z_2=36$, $2P=6$, $2Q=4$
  A1': 2, 3, −10, −31, −32, −33;
  A2': −13, −14, −15, 20, 21, −28;
  B1': −1, 7, 8, 29, 30, −36;
  B2': 11, 12, −18, −19, −25, −26,
  C1': −9 16, 17, −22, −23, −24;
  C2': −4, −5, −6, −27, 34, 35;
(3) $Z_2=54$, $2P=8$, $2Q=6$
  A1': 1, 2, 3, −35, −36, 42, 43, −49, −50;
  A2': 8, 9, −15, −16, 22, 23, −28, −29, −30;
  B1': 7, 33, −40, −41, 46, 47, 48, −53, −54;
  B2': −6, 13, 14, −19, −20, −21, 26, 27, −34;
  C1': −10, −11, −12 17, 18, −24, −25, 31, 32;
  C2': −4, −5, 37, 38, 39, −44, −45, −51, −52;
(4) $Z_2=48$, $2P=10$, $2Q=8$
  A1': 1, 2, −6, −7, 11, 12, −16, −45;
  A2': −21, 25, 26, −30, −31, 35, 36, −40;
  B1': 3, 4, −8, −37, 41, 42, −46, −47;
  B2': −13, 17, 18, −22, −23, 27, 28, −32;
  C1': −29, 33, 34, −38, −39, 43, 44, −48;
  C2': −5, 9, 10, −14, −15, 19, 20, −24.

(V) Cage construction of a cage-rotor asynchronous motor for harmonic starting: The cage rotor of an asynchronous motor for harmonic starting consists of conducting bars 2 and one or more end-ring 1 welded firmly to the bars. The end-ring 1 is made from high resistance material, which is used as the starting resistors. Many connecting pieces 3 made from low resistance material are fixed on opposite sides of the high resistance end-ring 1, each of which short-circuits two conducting bars 2. It should be designed as follows: the current in the rotor induced by the starting harmonics must flow through the high resistance end-ring 1 to form a path, while the current induced by the fundamental field flows through the conducting bars 2 and the connecting pieces 3, as well as the low resistance end-ring, if any, to form a closed-loop with low resistance. The arrangement of the connecting pieces on the high resistance end-ring 1 is shown as FIG. 24, and FIG. 25, wherein the arrangement of FIG. 24 is used for a motor with the pole number $2P=2$ and the arrangement of FIG. 25 is used for motors with different pole numbers.

The number of length of the connecting pieces will be changed only when the pole-number and slot-number are different from each other. Further explanation will be given below by three examples.

Figure 24A:
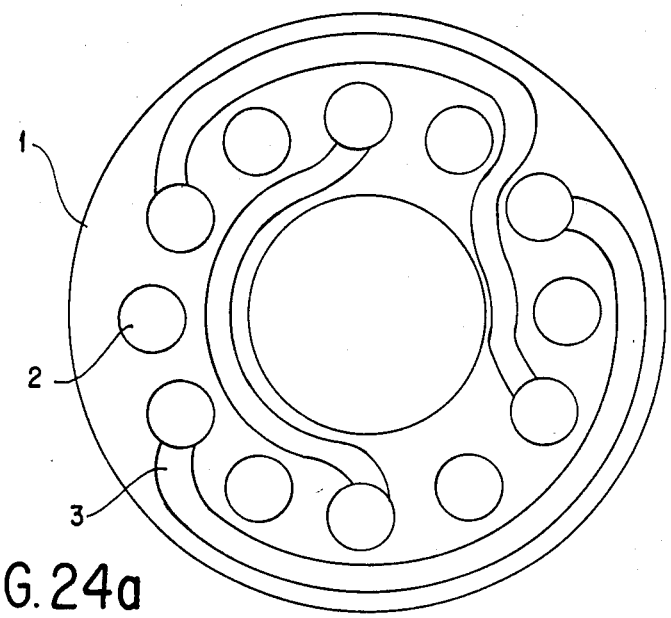
FIGS. 24a and 24b show a multiphase connection rotor of a cage asynchronous motor for harmonic starting, (a) the connection of the connecting pieces at the front of the high resistance end-ring, (b) the connection of the connecting pieces at the back of the high resistance end-ring.
Figure 24B:
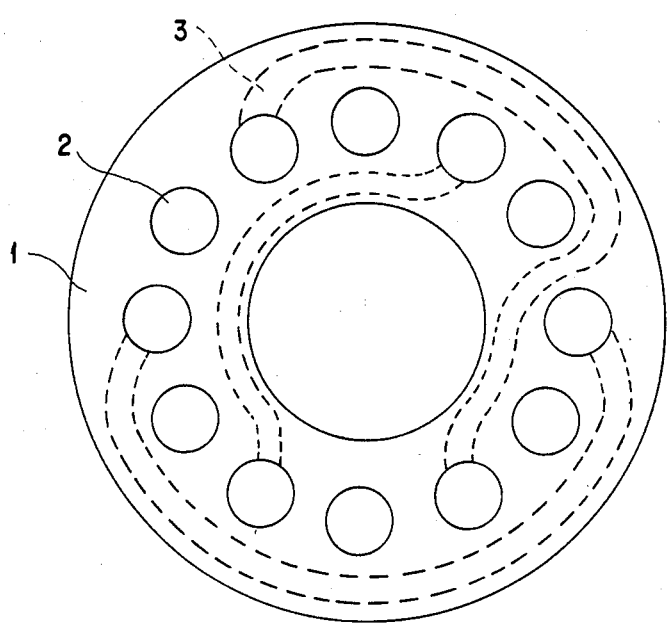

1. Polyphase connection mode—For two end-rings in front of and behind the cage, one of them is made from a low resistance material and the other is made from a high resistance material. There are a lot of connecting pieces 3 fixed on the surface of the high resistance end-ring 1, each piece short-circuits two conducting bars 2 parted at 180° mechanical from each other. This cage construction is suited to all cases where the number of pole-pairs for the working wave P is odd and the number of pole-pairs for a starting harmonic Q is even. For example, $Z_2=12$, $2P=2$, $2Q=4$, the connection mode of the connecting pieces 3 on the high resistance end-ring 1 is shown in FIG. 24, wherein the connection of FIG. 24a is the connection of three connecting pieces 3 in the front, and the connection of FIG. 24b is the connection of three connecting pieces 3 on the back (illustrated as a dot-line).

2. Three-phase connection mode—Both the two end-rings 1 are made from high resistance materials. When the pole-number of fundamental or working wave 2P is 4 or more, if the number of slots per pole of the rotor is a multiple of three, the three-phase connection mode may be used. In this case, the slot number of slots per pole per phase $q_2=Z_2/(6P)=$integer. Therefore, each phase contains $q_2$ closed loops. The whole conducting bars 2 and connecting pieces 3 of the rotor form $3q_2$ closed loops. It is adapted for the pole number of the starting harmonic $2Q=2P-2$ and $2Q=2P+2$. Two examples will be given below.

(1) $Z_2=24$, $2P=4$, $2Q=2$, 6

Figure 25A:
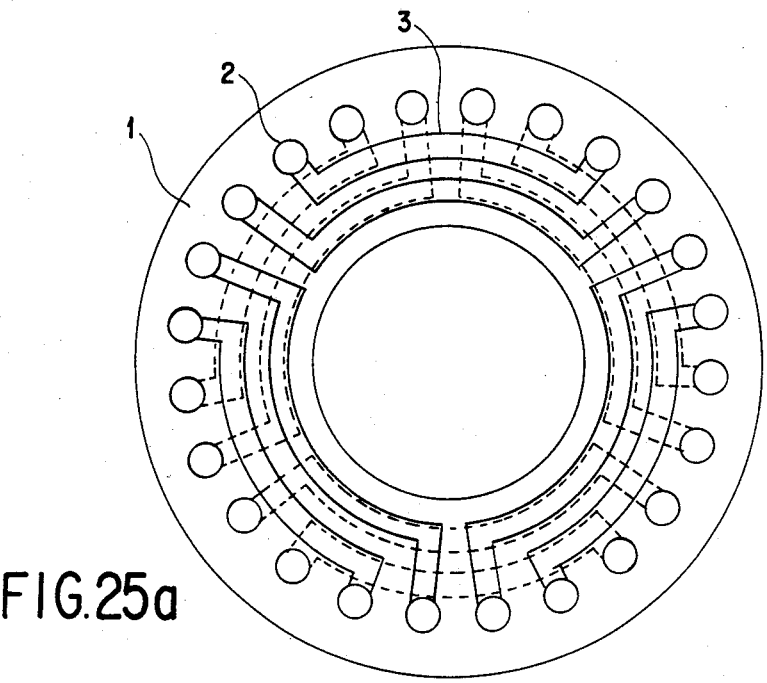
FIGS. 25a and 25b show a three-phase connection rotor of a cage asynchronous motor for harmonic starting, (a) the connection of the connecting pieces on the front end-ring, (b) the connection of the connecting pieces on the rear end-ring.
Figure 25B:
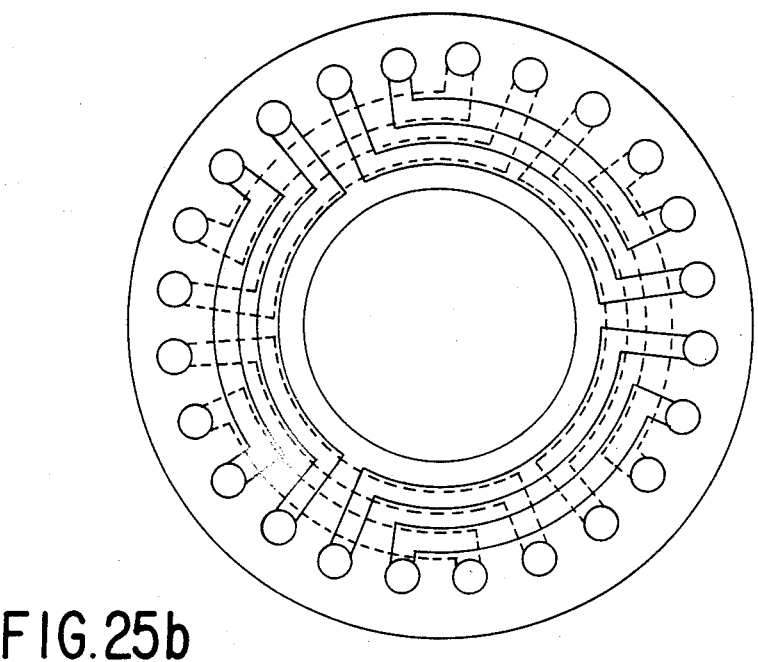
Figure 26:
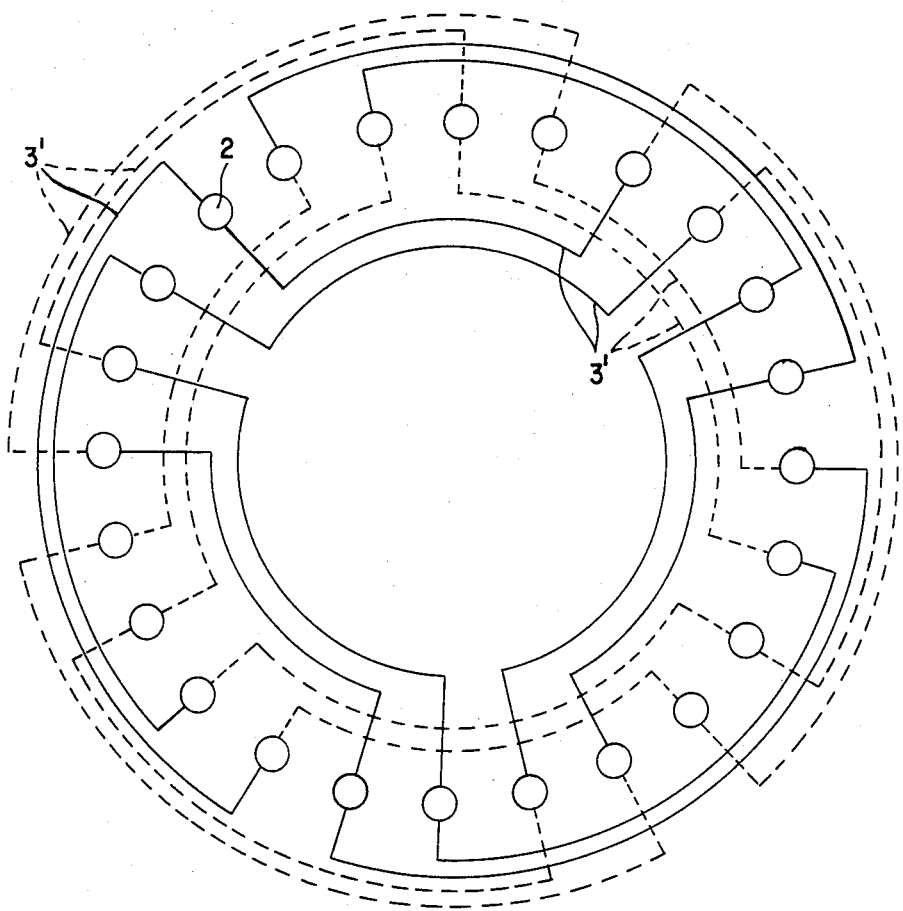
FIG. 26 shows a three-phase connection of a cage rotor shown by a development, $Z_2=24$, $2P=4$, $2Q=2$, 6.

The connection mode of the connecting pieces 3 on the end-ring 1 is shown in FIG. 25, wherein FIG. 25a shows the connection of the front end-ring 1, where the connecting pieces 3 shown as a solid line is in the front of the end-ring 1 and the ones shown as a dotted line are at the back of the end-ring (i.e., the side next to the iron core). FIG. 25b shows the connection of the rear end-ring 1, where the connecting pieces 3 in solid line close to the iron core (on the front side) and the connecting pieces 3 shown as a dotted line are on its back (i.e., close to the bearing). In this case, $q_2=2$, the rotor has $3\times 2=6$ closed loops. In order to illustrate the connection of six loops of the rotor clearly, FIG. 25a and FIG. 25b may be put together so as to have a development as shown in FIG. 26, in which each connecting strip is represented by an arc. The arc 3' at the inner of the circle of the conducting bar 2 is the connecting piece 3 of the front end-ring, where the solid line shows the front side and dotted line shows the back. The arc 3' on the outside of the circle of the conducting bar 2 is the connecting piece 3 of the rear end-ring, where the solid line shows the front side and the dotted line shows the back. This kind of development is used for all other alternatives in order to have the drawings simplified.

(2) $Z_2=48$, $2P=8$, $2Q=6$, 10

Figure 27:
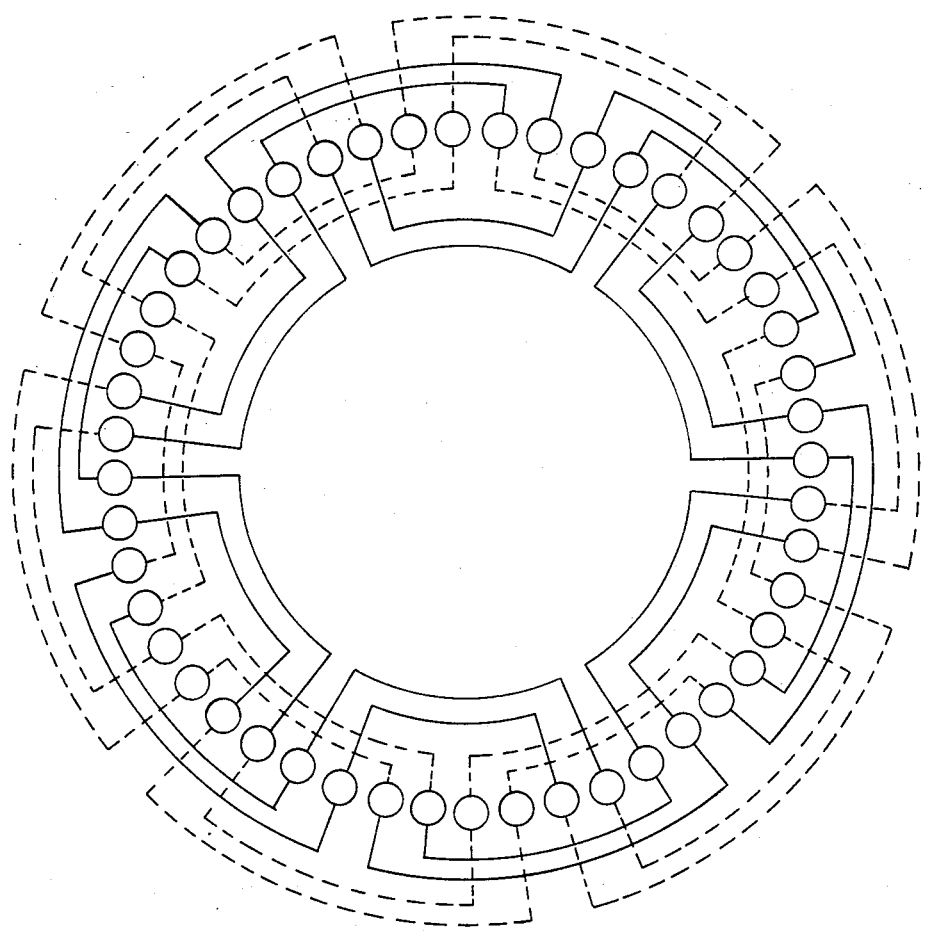
FIG. 27 illustrates a three-phase connection of a cage rotor shown by a development, $Z_2=48$, $2P=8$, $2Q=6$, 10

The connection mode and its development of the embodiment are shown in FIG. 27, from which six loops constructed by conducting bars and connecting pieces may be seen.

3. Two-phase connection mode—Both end-rings are high resistance rings. When the pole number of the working wave 2P is 4 or more, it can be used if the number of slots per pole of the rotor $Z_2/2P$ is an even number. Since the number of slots per pole per phase $q_2=Z_2/4P=$integer, each phase contains $q_2$ closed loops. All of the conducting bars and connecting pieces of the rotor form $2q_2$ closed loops. It may be used where the pole number of starting harmonic is $2Q=2P-2$ and $2Q=2P+2$. Three examples will be given below.

(1) $Z_2=24$, $2P=6$, $2Q=4$, 8

Figure 28:
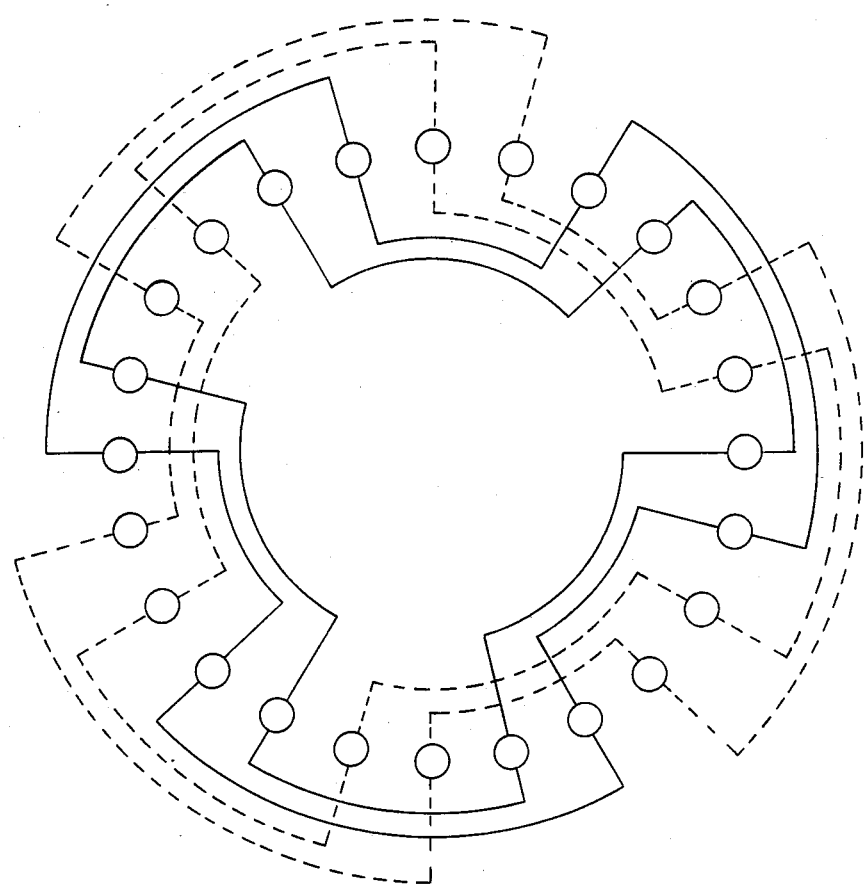
FIG. 28 illustrates a two-phase connection of a cage rotor shown by a development, $Z_2=24$, $2P=6$, $2Q=4$, 8.

The development of the connection of this embodiment is shown in FIG. 28, in which half of the conducting bars and the connecting pieces shown in solid line form two closed loops, the other half of the conducting bars and connecting pieces shown in dotted line form two other closed loops. All together there are four closed loops which is in line with $2q_2=2\times 2=4$ in theory.

(2) $Z_2=32$, $2P=8$, $2Q=6$, 10

Figure 29:
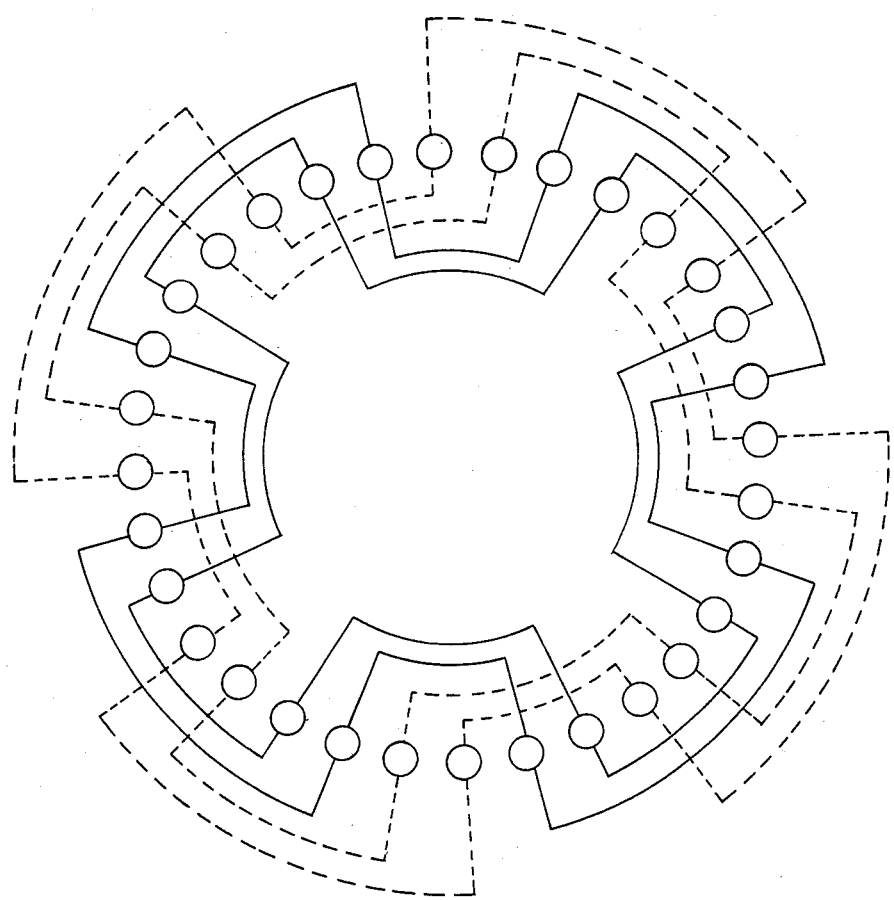
FIG. 29 illustrates a two-phase connection of a cage rotor shown by a development, $Z_2=32$, $2P=8$, $2Q=6$, 10.

The development of the connection of this embodiment is shown in FIG. 29, by which four loops of the rotor are illustrated clearly.

(3) $Z_2=40$, $2P=10$, $2Q=8$, 12

Figure 30:
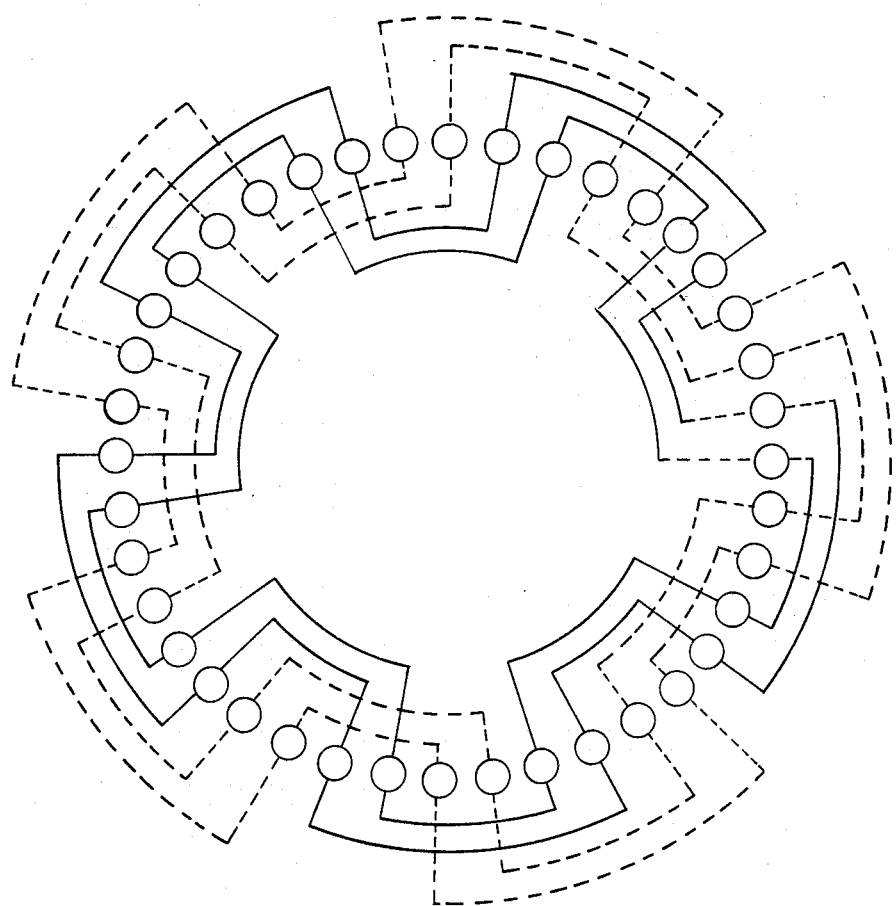
FIG. 30 is a two-phase connection of a cage rotor shown by a development, $Z_2=40$, $2P=10$, $2P=8$, 12.

The development of the connection of this embodiment is shown in FIG. 30, in which there are also four closed loops.

What we claim is:

1. A method of starting motors with the aid of changing the connection of a stator winding and a rotor winding of the motor, comprising the steps of:

connecting the stator winding to produce very strong harmonic magnetic fields by the stator winding when starting said motor, said very strong harmonic magnetic fields being used as starting harmonics;

connecting a plurality of resistance elements firmly with the rotor winding;

inducing currents in the rotor by said starting harmonics to flow through said resistance elements;

inducing current in the rotor by working magnetic fields of said stator winding so that the current not to flow freely through said resistance elements wherein the starting torque increases and the starting current decreases as a result of the combined effect of the starting harmonics produced by said stator winding and said resistance elements on the rotor;

running up the rotor of the motor so that the speed of the motor nearly reaches its rated value; and reconnecting the stator winding of said motor according to a normal connection so as to eliminate said starting harmonics, wherein said motor is running normally due to the effect of the working magnetic fields, and the current in the rotor flow only through a part of the rotor winding and not said resistance elements.

2. A method of starting motors according to claim 1 further including the steps of:

dividing the stator winding of the motor into two parts;

producing said working magnetic fields and said starting harmonics when each part of said stator winding is switched on;

connecting the two parts inversely and then switching them on so that the two working magnetic fields cancel each other, but the starting harmonics strengthen each other;

reconnecting the two parts normally and switching them on so that the two working magnetic fields strengthen each other, but the starting harmonics cancel each other;

starting the motor at a light load;

switching the first part of the stator winding on;

starting the motor with the aid of the combined effect of working magnetic fields and starting harmonics;

running up the motor near its rated speed;

connecting the second part of the stator winding with the first part normally and switching them on so that the starting harmonics are eliminated, the working magnetic fields are strengthened and the motor is running at normal conditions;

starting the motor at a heavy load;

connecting the two parts of the stator winding inversely and switching them on;

starting the motor by high starting torque produced by the starting harmonics; and reconnecting the two parts of the stator winding normally when the motor speed is near its rated value and switching them on so that said starting harmonics are eliminated and the motor is running normally with the aid of the working magnetic fields.

3. A method of starting motors according to claim 1 further including steps of:

connecting the stator winding of the motor in Y-connection;

dividing the stator winding into two parts and switching only one part of the stator winding, connected in Y-connection, on when starting;

starting the motor by the starting harmonics;

running up the motor to near its rated speed; and reconnecting the stator winding according to its normal conditions and switching them on so that the starting harmonics are eliminated, and the motor is running normally with the aid of the working magnetic fields.

4. A method of starting motors according to claim 1, 2 or 3 further comprising the steps of:

fixingly connected a plurality of resistance elements with the rotor winding and rotating with the rotor;

inducing the current in the motor by the starting harmonics produced by the stator winding to flow through said resistance elements; and inducing the current by the working magnetic fields to flow only through a part of the rotor winding and not said resistance elements.

5. A method of starting motors according to claim 1, 2 or 3, further comprising the steps of:

starting the rotor using a plurality of high-resistance end-rings to serve as the resistance elements for starting, each of said end-rings having a plurality of holes, said rotor winding being a plurality of bars, the number of holes being equal to the number of bars;

passing each of said bars through each of said holes and welding said bars with said end-rings;

installing a plurality of connecting pieces, made of low-resistance material, on said end-rings;

short-circuiting a pair of bars by each connecting piece;

inducing current in said rotor bars by starting harmonics produced by the stator winding to flow through the high-resistance end-rings; and inducing current by the working magnetic fields to flow only through the bars and the connecting pieces.

6. A method of starting motors according to claim 1, 2 or 3, further comprising the steps of:

connecting two points of one polyphase of the rotor winding to two slip rings;

inducing current in the rotor by the starting harmonics produced by the stator winding to flow through said resistance elements; and inputting a D.C. excitation current from the slip rings to flow only through said one polyphase of the rotor winding and not said resistance elements and producing a rotor working magnetic field.

* * * * *